US010705199B2

(12) United States Patent
Peckham

(10) Patent No.: US 10,705,199 B2
(45) Date of Patent: Jul. 7, 2020

(54) AVIATION TRANSPONDER

(71) Applicant: Urban Canyon Flight, White Salmon, WA (US)

(72) Inventor: Canyon Daniel Peckham, White Salmon, WA (US)

(73) Assignee: Urban Canyon Flight, White Salmon, WA (US)

(*) Notice: Subject to any disclaimer, the term of this patent is extended or adjusted under 35 U.S.C. 154(b) by 272 days.

(21) Appl. No.: 15/828,310

(22) Filed: Nov. 30, 2017

(65) Prior Publication Data

US 2019/0162841 A1    May 30, 2019

(51) Int. Cl.
G01S 13/76    (2006.01)
G01S 1/68    (2006.01)
G08G 5/00    (2006.01)
G01S 19/03    (2010.01)
G01S 13/933    (2020.01)

(52) U.S. Cl.
CPC ............ G01S 13/767 (2013.01); G01S 1/685 (2013.01); G01S 13/765 (2013.01); G01S 19/03 (2013.01); G08G 5/0004 (2013.01); G01S 13/933 (2020.01)

(58) Field of Classification Search
CPC ... G01S 13/765; G01S 13/767; G01S 13/9303
See application file for complete search history.

(56) References Cited

U.S. PATENT DOCUMENTS 3,750,168 A * 7/1973 Schrader ............. G01S 13/9303
342/30
4,027,307 A * 5/1977 Litchford .............. G01S 13/781
342/32
4,218,680 A * 8/1980 Kennedy ............... G01S 13/767
342/44
4,897,661 A * 1/1990 Hiraiwa ................ G01S 13/878
342/357.31
5,089,822 A * 2/1992 Abaunza .............. G01S 13/765
329/304

(Continued)

FOREIGN PATENT DOCUMENTS

WO    WO2016130495 A1    8/2016

OTHER PUBLICATIONS

The PCT Search Report and Written Opinion dated Jan. 10, 2019 for PCT Application No. PCT/US2018/052917, 12 pages.

Primary Examiner — Peter M Bythrow
(74) Attorney, Agent, or Firm — Lee & Hayes, P.C.

(57) ABSTRACT

An improved aviation transponder is discussed herein. The improved aviation transponder demonstrates improved cohabitation and survivability characteristics, allowing the transponder to be placed near other antennas without causing or receiving interference, and reducing potential damage caused by high-energy electromagnetic fields, such as those experienced near an air traffic control (ATC) or military radar installation. Additionally, a small form factor of the transponder results in a smaller, more compact aircraft that consumes less energy, reduces heat dissipation, and maximizes battery life and/or flight time. The transponder may comply with modular interface standards, and may include a radio configured for transmitting 200-watt signals. Based at least in part on the improved performance, the transponder can be implemented in unmanned aerial vehicles (UAVs), for example.

20 Claims, 24 Drawing Sheets

(56) References Cited

U.S. PATENT DOCUMENTS

| | | | | |
|---|---|---|---|---|
| 5,506,584 | A * | 4/1996 | Boles | G01S 13/765 340/10.1 |
| 5,621,412 | A * | 4/1997 | Sharpe | G01S 13/74 340/10.33 |
| 6,278,396 | B1 * | 8/2001 | Tran | G01S 13/9303 342/29 |
| 7,106,246 | B1 * | 9/2006 | Lindell | G01S 13/767 342/175 |
| 7,239,264 | B2 * | 7/2007 | Cherniakov | G01S 13/767 342/42 |
| 7,414,567 | B2 * | 8/2008 | Zhang | G01S 7/006 342/133 |
| 9,134,416 | B2 * | 9/2015 | Stayton | G01S 13/9303 |
| 2003/0142002 | A1 * | 7/2003 | Winner | G01S 3/46 342/36 |
| 2003/0233192 | A1 * | 12/2003 | Bayh | G01S 13/765 701/301 |
| 2008/0122693 | A1 * | 5/2008 | Needham | G01S 7/03 342/368 |
| 2008/0150784 | A1 * | 6/2008 | Zhang | G01S 7/006 342/30 |
| 2008/0165059 | A1 * | 7/2008 | Karr | G01S 13/765 342/378 |
| 2008/0238759 | A1 * | 10/2008 | Carocari | G01S 13/785 342/47 |
| 2009/0322587 | A1 * | 12/2009 | Stayton | G01S 7/003 342/37 |
| 2012/0001788 | A1 * | 1/2012 | Carlson | G01S 13/784 342/30 |
| 2012/0068877 | A1 * | 3/2012 | Stayton | G01S 13/9303 342/30 |
| 2013/0181858 | A1 * | 7/2013 | Kojima | G01S 13/753 342/51 |

* cited by examiner

AVIATION TRANSPONDER

BACKGROUND

Aviation systems use various types of sensors and methods to gather position data to monitor aircraft location for pilot situational awareness, flight separation, and air traffic collision avoidance. Sensors typically include an altimeter/altitude encoder (e.g., a static pressure sensor) and global navigation satellite systems (GNSS) (e.g., GPS) with satellite-based augmentation systems (SBAS) (e.g., WAAS), which may be used independently, or may include other disparate data sources, or a fusion of sensor data, from additional sources such as airspeed sensors (e.g., a dynamic pressure sensor), heading sensors (e.g., gyroscopic, magnetic, non-magnetic, etc.), attitude sensors (e.g., accelerometers, gyroscopes, etc.), and/or vertical velocity sensors (e.g., rate-of-climb). Functional requirements for both sensors and radios (e.g., for conveying such information) are often contained in technical standard orders (TSO), which are design approvals from the Federal Aviation Administration (FAA) and other civilian aviation authorities (e.g., European aviation safety agency (EASA) associated with respective TSO equivalents). The TSO will often reference a minimum operational performance specification (MOPS), which contains detailed technical operational requirements, as well as standard and environmental tests required.

Traditionally, TSOs defining design approval requirements for aviation radios and sensors are written for large, manned aircraft. Many design approvals are difficult to implement on unmanned aerial vehicles (UAVs). For example, functional requirements related to human interface aspects are difficult—if not impossible—to implement, given that there is no human on-board the UAV. Further, UAVs can present additional challenges in terms of electrical power availability, size, and weight. Additionally, implementing a number of radios on a UAV can present cohabitation problems, and further, typical missions of a UAV can increase exposure to large megawatt radio signals, which can cause damage to unprotected UAVs.

Due to the aforementioned design constraints associated with UAVs and regulatory requirements, it is desirable to provide a system that is capable of addressing one or more of these constraints while still meeting TSO requirements for Mode A/C/S transponders, ADS-B, and TABS devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
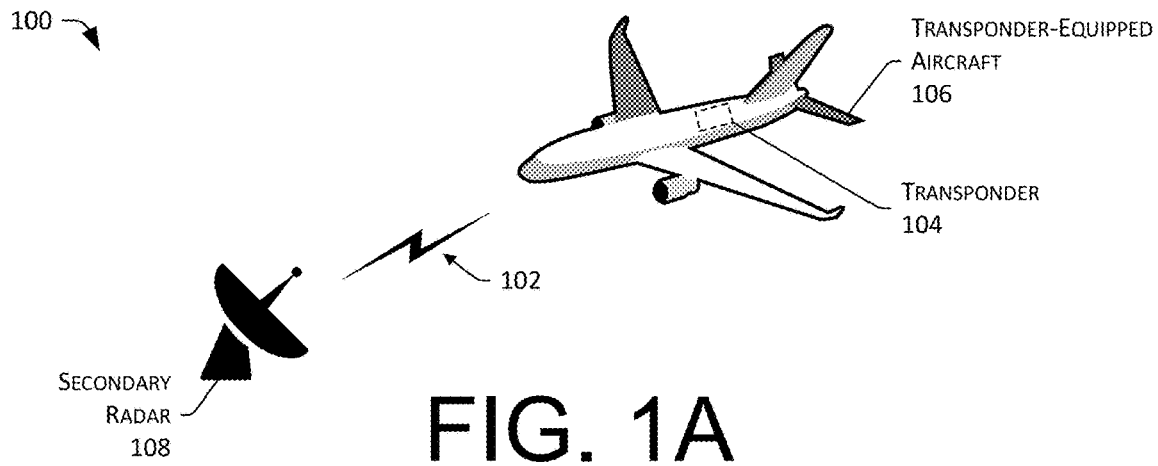
FIG. 1A illustrates an example of an air-to-ground or a ground-to-air transmission (e.g., between an aircraft equipped with a transponder, a traffic awareness beacon system (TABS), and/or an automatic dependent surveillance-broadcast (ADS-B) system, and a secondary radar system).

Embodiments of this disclosure are directed to techniques and apparatuses for improving aviation transponders. For example, such transponders can include Mode A transponders, Mode C transponders, Mode S transponders, automatic dependent surveillance-broadcast (ADS-B) transponders, light aviation SSR transponder (LAST), and/or traffic awareness beacon systems (TABS). In general, the aviation transponder can provide reduced size and weight, as well as reduced power requirements. Further, the improved aviation transponder can provide improved performance in radio-frequency-dense environments (e.g., improved cohabitation characteristics) and improved operation in high-powered radio-frequency environments (e.g., improved survivability characteristics), making the improved aviation transponder particularly suited for UAV implementations.

In some examples, a Mode A or Mode C transponder can receive an interrogation signal from an aircraft- or ground-based radar system and can provide an identification code associated with the aircraft in response. In some instances (e.g., a Mode C implementation), additional information can be provided in response to an interrogation, including pressure altitude. In some examples, a Mode S transponder can provide its unique aircraft address in an unsolicited transmission (also referred to as a "squitter"), can subsequently receive an interrogation signal, can determine that the interrogation signal is directed to the particular aircraft, and can provide a response including identification and capability information and/or other sensor information based at least in part on the interrogation signal being associated with the aircraft, including but not limited to, Mode A identity, Mode C altitude, identity, and data link capability. In some instances, the interrogation can be initiated by ground-based radar, and in some instances, the interrogation can be initiated by other aircraft (e.g., equipped with a traffic collision avoidance system (TCAS)) to allow for situational awareness and to allow for self-separation of aircraft. In some instances, any transmission by the transponder can be referred to as an identification signal.

In some examples, an ADS-B or TABS transponder can squitter identification and capability information, with sensor data based at least in part on the GNSS position associated with the aircraft, including but not limited to, position, velocity, height, airspeed, altitude, heading, location, intent, and the like.

In some instances, the aviation transponder can determine a position and velocity of the aircraft by receiving data from sensors onboard the aircraft (e.g., GPS position/velocity/height, airspeed sensors, pressure altitude sensors, vertical velocity sensors, heading sensors, attitude sensors, etc.) and can broadcast the position, velocity, and/or associated information. The determination of aircraft information (e.g., identity information, airspeed, heading, altitude, position, etc.) and subsequent broadcasting of information can be referred to as automatic dependent surveillance-broadcast (ADS-B). In some instances, such information can be broadcast independent of any interrogation signal, and in some instances, the information can be received by other aircraft (e.g., equipped with a traffic collision avoidance system (TCAS), ADS-B in, etc.) to allow for situational awareness and to allow for self-separation of aircraft.

In some examples, the aviation transponder can include a controller and/or an integrated circuit (e.g., a field-programmable gate array) controlling operations of the transponder, as discussed herein. Further, the transponder can include a local oscillator (LO), including a phase lock loop (PLL) with a phase-frequency detector (PFD) and a voltage controlled oscillator (VCO) for generating a radio signal to transmit and/or receive signals, as discussed herein. In some instances, the aviation transponder can include a single local oscillator that can be selectively coupled to a transmission path (also referred to as a transmit path) or a reception path (also referred to as a receive path) to transmit and/or receive signals. In some instances, various implementations can include local oscillators independently coupled to the transmission path and the reception path, and in some instances, a single local oscillator can be coupled to the transmission path and the reception path via a power divider our coupler, for example, to split a portion of power provided by the single local oscillator to the various paths. In some instances, the aviation transponder can include a plurality of reception paths to differentiate between signals received from various directions (e.g., from different antennas).

In some examples, a transmission path can include one or more amplifiers configured to receive a signal generated by the local oscillator and to amplify the signal to output by an antenna coupled to the aviation transponder. In some instances, the one or more amplifiers can include a 0.1 Watt transmit amplifier coupled to a 9-Watt driver amplifier, which is in turn coupled to a 250-Watt power amplifier. Further, the 250-Watt power amplifier can be coupled to a switch that is configured to selectively couple an antenna path to the transmit path or the receive path.

Further, in some instances, the one or more amplifiers of the transmission path can be selectively disabled and enabled to enter a low-power state or high-power state, respectively. For example, the controller and/or integrated circuit can enable the one or more amplifiers to transmit a signal and can disable the one or more amplifiers when not receiving a signal, thereby reducing power draw by the components, and improving cohabitation. Further, in some instances, the one or more amplifiers of the transmit path can receive power from a constant current source which reduces power consumption by efficiently providing power to the devices. Further, the one or more amplifiers of the transmit path can include functionality to receive control via one or more field effect transistors (FETs) for direct gate modulation to reduce power consumption.

In some examples, the reception path can include one or more filters or other components to receive a signal captured by an antenna coupled to the antenna path. In some instances, the reception path can include, but is not limited to, a limiter component, a receive filter component, an amplifier component, an image reject filter, a mixer, an intermediate frequency filter component, a log detect component, and an analog-to-digital converter (ADC). Further, a portion of the reception path (e.g., the mixer) can receive a signal from the local oscillator to determine a difference, as an intermediate frequency, between the local oscillator signal and a received signal. In some instances, the reception path can be selectively enabled based on one or more switches coupling components to receive one or more signals.

In some instances, the receive path can include one or more limiter components to protect components of the transponder from nearby high-powered transmitters. For example, the limiter components can include one or more of quarter-wave elements (e.g., microstrips, striplines, and/or lumped elements, etc.) coupled with one or more PIN diodes and/or Schottky diodes to redirect harmful signals from damaging components of the aviation transponder.

In some instances, the aviation transponder can include one or more reference frequencies (e.g., a crystal, oscillator, clock, etc.) to generate a reference signal for some or all of the components in the transponder. For example, the aviation transponder can include a single reference oscillator to generate a single clock signal that can be distributed to the components of the transponder, thereby reducing weight, space, and power requirements for the components.

In some instances, the receive path can further include a differential phase shift keying (DSPK) receiver to support Mode S capabilities. For example, the receive path can receive a signal and can determine a phase shift of the received signal. In some instances, the DSPK receiver can be implemented as a Costas loop in hardware providing an indication of phase shift to the controller and/or integrated circuit. Further, in some instances, some or all of the components in the Costas loop can be disabled until a time in which a pattern associated with an interrogation signal is detected at another component, thereby causing activation of the disabled components. In some instances, enabling and disabling the Costas loop can further reduce power consumption of the transponder. In some instances, the Costas loop provides demodulated DPSK data output in hardware, eliminating the need for additional demodulating in firmware or software.

In some instances, the antenna path can include one or more filters to improve cohabitation (e.g., with other antennas of the aircraft). For example, the one or more filters can include a bandpass and/or notch filter configured to reject signals outside a transmission and/or reception range of the transponder. Further, the transponder can include a low pass filter to further reduce unwanted signals from causing interference in a received or transmitted signal.

In some examples, the aviation transponder can receive and/or send data to other components in an aircraft via one or more communication ports, utilizing an RS232 interface, for example. Of course, any interface can be used, including but not limited to USB, Ethernet, Controller Area Networks (CAN), wireless protocols, and the like. In some instances, the aviation transponder can further include one or more antenna ports to couple the aviation transponder to an antenna, for example. In some instances, the one or more antenna ports can include a coaxial connection.

In various embodiments, the techniques and/or systems described herein can improve a functioning of aviation transponders by reducing an amount of electrical power consumed by such devices. Further, despite reduced power consumption, the techniques and/or systems described herein facilitate improved cohabitation with other antennas of an aircraft and/or improved survivability when exposed to high-powered radio frequency signals. Thus, the systems and methods improve equipment operation, save power, reduce size, reduce interference received from other signals, and reduce possibilities of harmful signals from damaging or destroying components of the transponder, among other benefits.

Example Environments

FIG. 1A illustrates an example 100 of an air-to-ground transmission or a ground-to-air transmission (e.g., between an aircraft equipped with a Mode A/C/S transponder, a traffic awareness beacon system (TABS), and/or an automatic dependent surveillance-broadcast (ADS-B) system, and a ground-based secondary surveillance radar (SSR) installation). As illustrated, the example 100 shows a signal 102 transmitted between a transponder 104 associated with a transponder-equipped aircraft 106 and a secondary radar 108, for example. In some instances, secondary radar 108 can be installed on a boat or ship (e.g., an aircraft carrier, etc.), in which case, the air-to-ship and ship-to-air transmissions can be qualitatively similar to the descriptions of air-to-ground and ground-to-air, respectively, provided herein (e.g., shipborne systems function qualitatively similarly to terrestrial systems).

In some instances, the secondary radar 108 can transmit an interrogation signal that can be received by the transponder 104. In some instances, the transponder 104 can receive the interrogation signal and can transmit a signal based at least in part on the interrogation signal. In some instances, the signal 102 can represent the interrogation signal transmitted by the secondary radar 108 and/or a signal responsive to the interrogation signal, transmitted from the transponder 104. In some instances, the signal 102 can represent an unsolicited transmission (e.g., a squitter) from the transponder 104.

As can be understood, in some instances, the transponder 104 can be configured to operate in a variety of modes, including Mode A, Mode C, Mode S, ADS-B, and the like. In some instances, the transponder-equipped aircraft 106 can represent any aircraft, including but not limited to commercial aircraft, private aircraft, jet powered aircraft, propeller powered aircraft, gliders, hot air balloons, UAVs, experimental aircraft, helicopters, and the like.

In some instances, the secondary radar 108 can represent any transmitter capable of transmitting and/or receiving any signals in connection with one or more of Mode A communication, Mode C communication, Mode S communication, ADS-B (in/out), TABS, and the like.

Figure 1B:
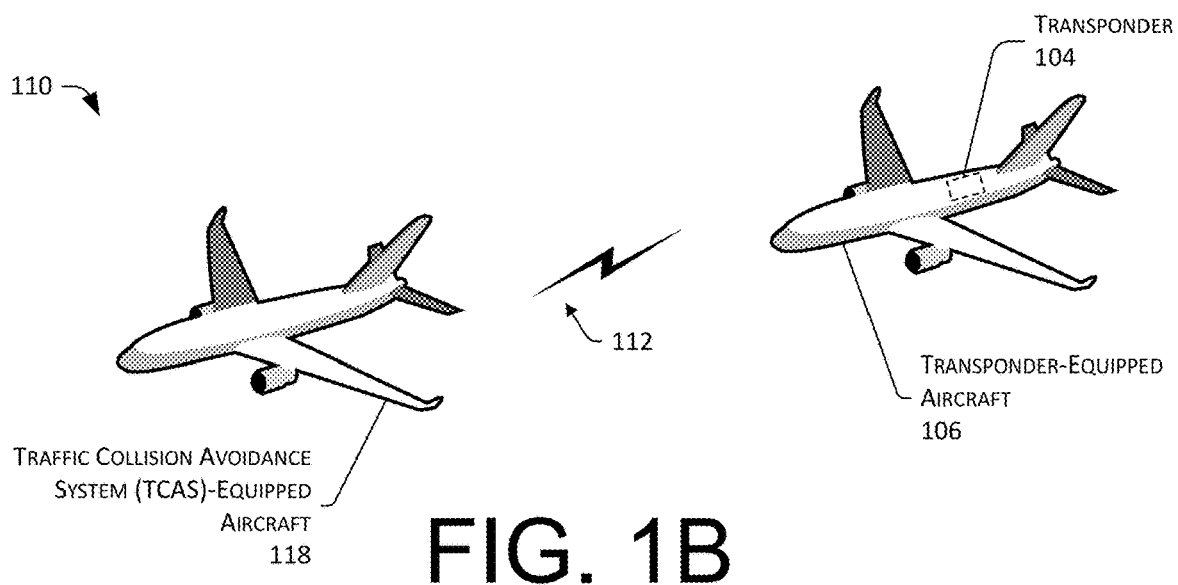
FIG. 1B illustrates an example of an air-to-air transmission (e.g., between a first aircraft equipped with a transponder, TABS, and/or an ADS-B system, and a second aircraft equipped with a traffic collision avoidance system (TCAS) and/or an ADS-B receiving system).

FIG. 1B illustrates an example 110 of an air-to-air transmission (e.g., between a first aircraft equipped with a transponder, TABS, and/or an ADS-B system, and a second aircraft equipped with a traffic collision avoidance system (TCAS) and/or an ADS-B receiving system). As illustrated, the example 110 shows a signal 112 transmitted between the transponder 104 and TCAS-equipped aircraft 118, for example.

In some instances, the signal 112 can represent an interrogation signal transmitted by the TCAS-equipped aircraft 118 and/or a signal responsive to the interrogation signal, transmitted from the transponder 104. In some instances, the transponder 104 can broadcast information associated with the transponder-equipped aircraft 106 in accordance with an automatic dependent surveillance-broadcast (ADS-B) protocol, as discussed herein. For example, the signal 112 can represent information transmitted by the transponder 104 to be received by the TCAS-equipped aircraft 118, or any aircraft implementing ADS-B in. In some instances, the aircraft 106 and 118 can implement self-spacing to prevent collisions between the aircraft 106 and 118.

Figure 1C:
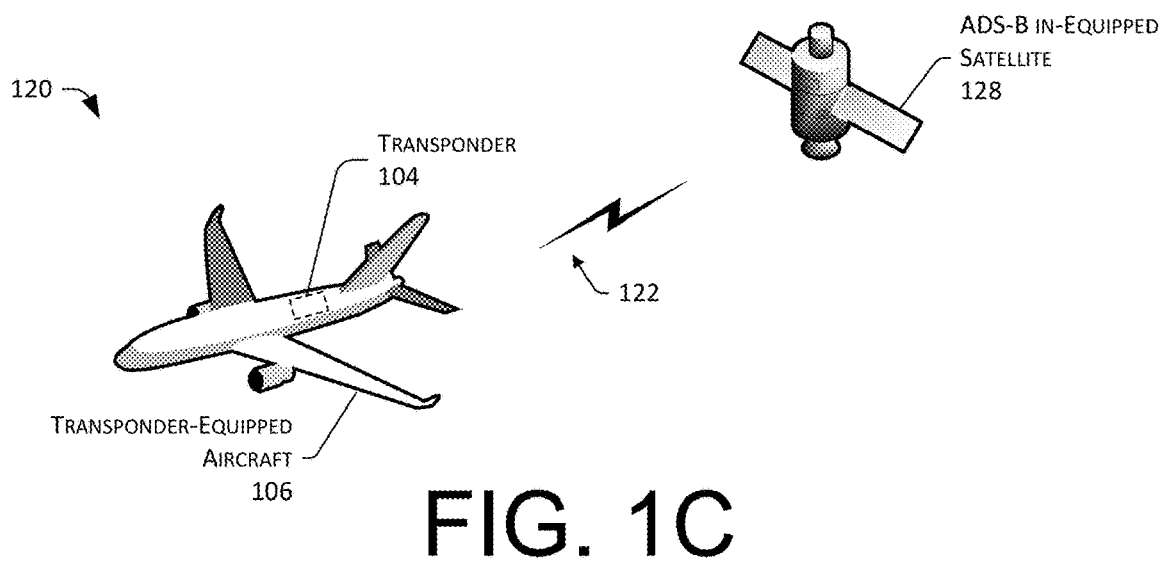
FIG. 1C illustrates an example of an air-to-space transmission (e.g., between an aircraft equipped with a transponder, TABS, and/or an ADS-B system, and a space vehicle in orbit around the earth with an ADS-B receiving system and/or passive (e.g., receive-only) secondary radar system (e.g., PCAS)).

FIG. 1C illustrates an example 120 of an air-to-space transmission (e.g., between an aircraft equipped with a transponder, TABS, and/or ADS-B system, and a space vehicle equipped with an ADS-B receiver in low earth orbit (LEO) around the earth). In some instances, a signal 122 can represent an unsolicited transmission (e.g., a squitter) from the transponder 104 received by satellite 128 equipped with ADS-B (e.g., ADS-B in, ADS-B over Satellite (AOS), ADS-B Link Augmentation System (ALAS), etc.). In some instances, the signal 122 can represent a secondary radar (e.g., Mode A, Mode C, or Mode S, etc.) response to a terrestrial or airborne interrogation, passively received by space vehicle satellite 128 (e.g., PCAS, receive-only secondary radar systems, etc.).

Thus, FIGS. 1A-1C illustrate that the aviation transponder 104 described herein can be implemented in a flexible manner (e.g., air-to-ground, ground-to-air, air-to-ship, ship-to-air, air-to-air, air-to-space, etc.), thereby providing data to various shipborne/terrestrial systems (e.g., SSR, ADS-B in, ground-based secondary radar, shipborne secondary radar, etc.), airborne systems (e.g., TCAS, ACAS, PCAS, ADS-B in, etc.), and spaceborne systems (e.g., ADS-B in, PCAS, AOS, Iridium NEXT, Globalstar, etc.).

Example Transponder and Methods

Figure 2:
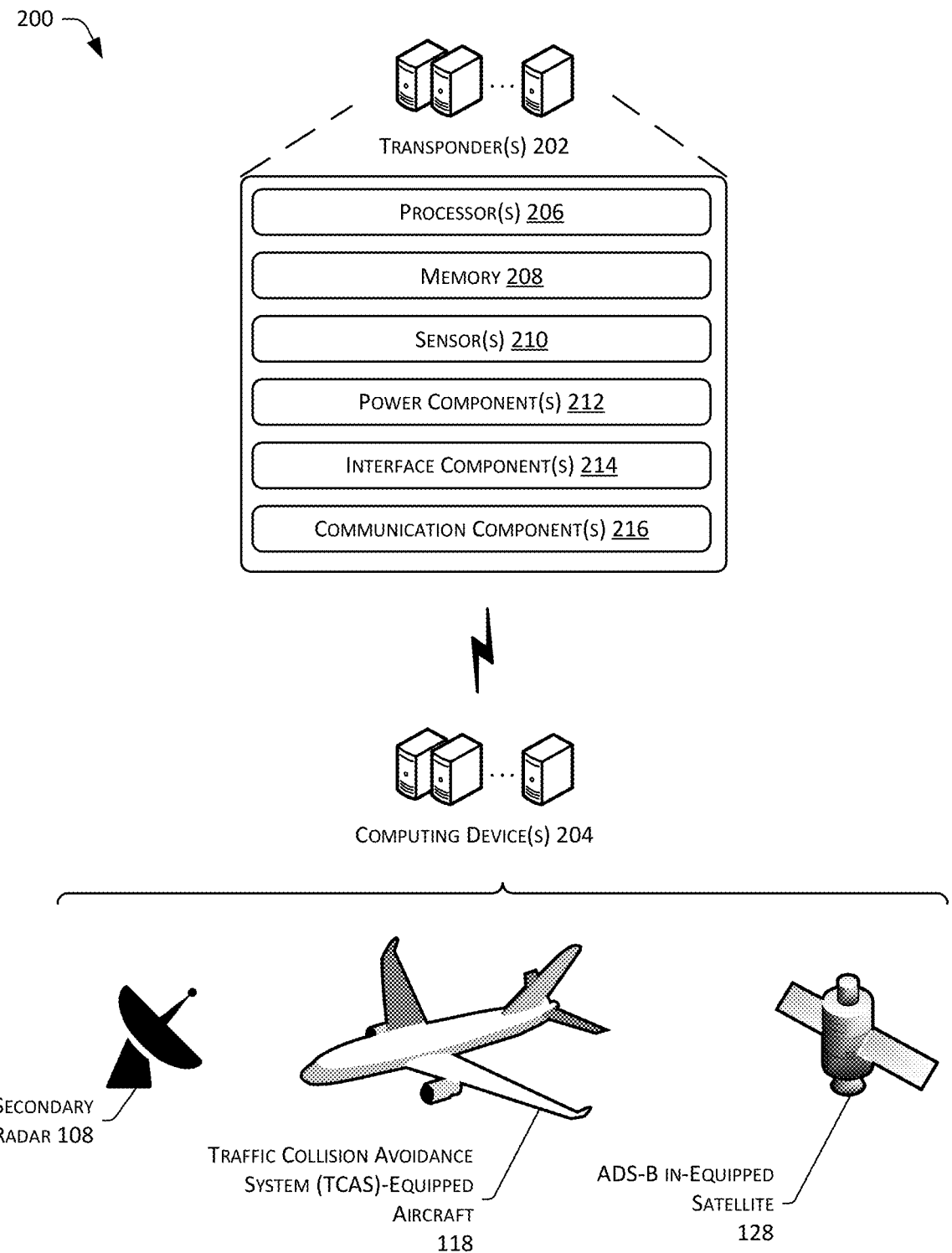
FIG. 2 illustrates an example of a block diagram of high-level components of a transponder, in accordance with embodiments of the disclosure.

FIG. 2 illustrates an example 200 of a block diagram of high-level components of a transponder, in accordance with embodiments of the disclosure. In some instances, a transponder 202 can be installed or included in any manned or unmanned aircraft, including heavier-than-air fixed-wing aircraft (e.g., airplanes, gliders, kites, etc.) and/or non-fixed wing aircraft (e.g., helicopters, quadcopters, etc.), lighter-than-air craft (e.g., blimps, hot air balloons, etc.), and the like. In some instances, a transponder 202 can be installed or included in manned or unmanned space vehicles, including space vehicles in transmit between orbit and the earth (e.g., during takeoff/landing). In some instances, the transponder 202 can be used by people/persons without aircraft (e.g., skydivers, parachuters, airport personnel, etc.). In some instances, a transponder 202 can be installed or included on surface-only vehicles (e.g., airport runway/taxiway maintenance and emergency vehicles, etc.) and stationary objects (e.g., hazardous, fixed objects such as power lines, skyscrapers and other tall buildings, antennas, windmills, etc.). In some instances, the transponder 202 can be communicatively coupled (e.g., via wireless communications) with one or more computing devices 204, which may represent the secondary radar 108, the TCAS-equipped aircraft 118, and/or the ADS-B in-equipped satellite 128, as discussed herein.

In some instances, the transponder 202 can include one or more processors 206, one or more memory elements 208, one or more sensors 210, one or more power components 212, one or more interface components 214, and one or more communication components 216.

In some instances, the processor(s) 206 can be a single processing unit or a number of units, each of which could include multiple different processing units. The processor(s) 206 can include a microprocessor, a microcomputer, a microcontroller, a controller, a digital signal processor, a central processing unit (CPU), a graphics processing unit (GPU), a security processor, etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 206 can be configured to fetch and execute computer-readable instructions stored in the memory 208.

The memory 208 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), ferroelectric random-access memory (FRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 208 can include an operating system configured to manage hardware and services within and coupled to a device for the benefit of other modules, components, and devices. In some embodiments, the one or more transponders 202 can include one or more servers or other computing devices that operate within a network service (e.g., a cloud service), or can form a mesh network, etc.

The techniques discussed above can be implemented in hardware, software, or a combination thereof. In the context of software, operations represent computer-executable instructions stored on one or more computer-readable storage media that, when executed by one or more processors, configure a device to perform the recited operations. Generally, computer-executable instructions include routines, programs, objects, components, data structures, and the like that perform particular functions or implement particular abstract data types.

The transponder 202 can, at its simplest, include no sensors. Alternatively, the transponder 202 can include one or more sensors 210, including but not limited to, a GPS sensor (or more generally, a GNSS sensor), a pressure sensor(s) (e.g., static and/or dynamic, e.g., to measure pressure altitude, airspeed and/or vertical velocity), a heading sensor, a rate of climb or descent sensor, weather sensors, temperature sensors, and the like. The sensors 210 can continuously or periodically monitor data at any interval, or upon request. In some embodiments, the transponder 202 can include one or more expansion ports to receive additional sensors or to receive additional sensor data. In some embodiments, the one or more sensors 210 can receive data via one or more serial communication ports, such as an RS232 port. Of course, the transponder 202 can interface with any number of sensors using any communication interface, as discussed herein.

In some examples, the transponder 202 can include a power component 212 to provide electrical power to one or more components of the transponder 202. In some instances, the power component 212 can receive power from the aircraft, and in some instances, the power component 212 can include batteries or other sources of electrical energy to power the transponder 202. In some instances, the power component can receive external power and can include an internal power source (e.g., one or more of batteries, super-capacitor, and the like) to prevent interruptions to service. Further, in some instances, the power component 212 can include any number of voltage sources and/or current sources to efficiently provide power to the internal components of the transponder 202, as discussed herein. Further, in some instances, the power component 212 can include circuitry to mitigate impacts of voltage spikes or induced signals.

In some examples, the transponder 202 can include an interface component 214 to provide an interface between the aircraft (e.g., in which the transponder 202 is installed) and the transponder 202. In some embodiments, this may include one or more serial communication ports, such as UART, SPI, I2C, or RS232. In some embodiments, this may include network protocols, such as controller area network (CAN) or Ethernet. In some embodiments, this may include wireless protocols, such as Bluetooth, Bluetooth Low Energy, Wi-Fi, Zigbee, Z-Wave, Lora, etc. In some embodiments, this may include isolation between the transponder and the data/power interface on the aircraft (e.g., via optoisolators for data, e.g., SEPIC converter for power).

The transponder 202 can further include one or more communication components 216 to transmit and/or receive communications between the transponder 202 and other aircraft or ground-based recipients (e.g., the computing devices 204), and/or between the transponder and other components of the aircraft, for example. As discussed above, the communication component(s) 216 can facilitate communications in accordance with at least one of: Mode A communication, Mode C communication, Mode S communication, ADS-B (out and/or in), a traffic collision avoidance system (TCAS), an air traffic control radar beacon system (ATCRBS), and the like.

Figure 3A:
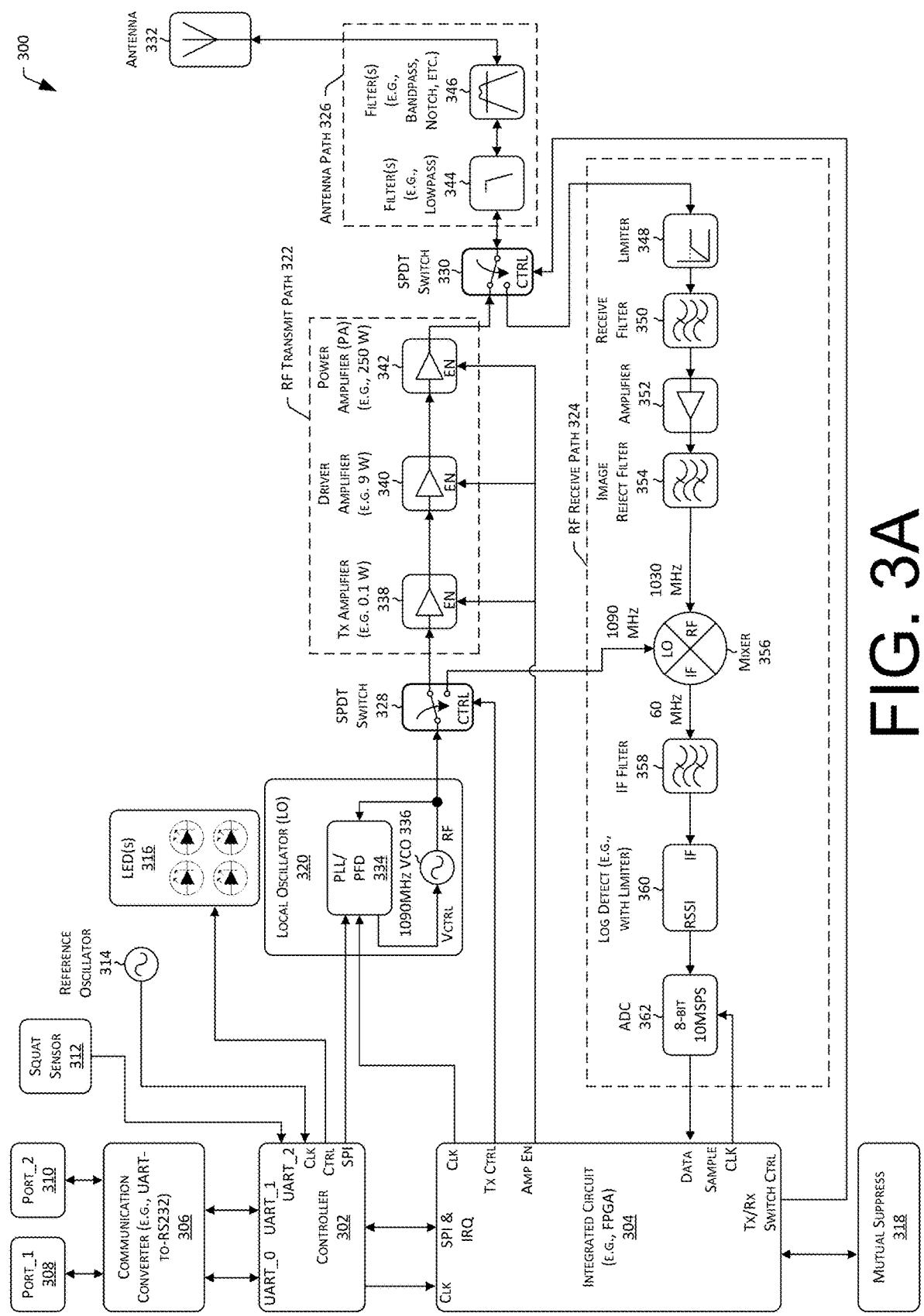
FIG. 3A illustrates a graphic representation of components of an example transponder (e.g., in accordance with a Mode A or Mode C communication standard, and/or supporting ADS-B and/or TABS functionality).

FIG. 3A illustrates a graphic representation of components of an example transponder 300 (e.g., in accordance with Mode A, Mode C, and/or ADS-B out communication standard). In some instances, the transponder 300 can correspond to the transponder 104 of FIGS. 1A and 1B.

In some embodiments, the transponder 300 can include a controller 302 controlling at least a portion of the operations of the transponder 300. For example, the controller 302 can include hardware, software, or firmware to perform or support the following functions, including but not limited to: a Real-Time Clock (RTC); 8-, 16-, or 32-bit timers; dynamic control of transmission and/or reception operations; analog-to-digital converters (ADCs); watchdog timer (WDTG); supply voltage supervisor (SVS); internal flash used for non-volatile memory; communication components used for external communication, for example, universal asynchronous receiver-transmitter (UART), serial peripheral interface (SPI), inter-integrated circuit (I2C), or controller area network (CAN); port interrupts (PxIV) used for edge-triggering of external sensors, and for interrupt request (IRQ) signals from various component; and/or integrated static pressure sensor, dynamic pressure sensor, temperature sensor, magnetic heading sensor, and/or GPS/GNSS.

In some instances, the controller 302 can include a 16-bit RISC processor, a digital signal processor (DSP), 16-bit registers, timers, analog to digital converters (ADCs), communication modules (UART, SPI, I2C, CAN), volatile and/or non-volatile memory, and the like.

Further, the transponder 300 can further include an integrated circuit 304, which may be implemented as a field-programmable gate array (FPGA). In some instances, the integrated circuit 304 can include hardware, software, or firmware to perform or support the following functions, including but not limited to: selectively enabling a transmit path or receive path using one or more switches; selectively enabling one or more transmit amplifiers; receiving data from the receive path; timing control of various components; modulation and/or demodulation of signals; to facilitate mutual suppression; and other features, discussed herein.

In various embodiments, the transponder 300 may be powered through an external power supply, such as via a multi-pin connector (e.g., a Hirose connector), which may provide power at various voltages, such as 10-38 volts. In other examples, the transponder 300 may be powered internally via batteries, for example. In some examples, the transponder 300 may include a communication converter (e.g., a UART-to-RS232 converter) 306 which receives data through various ports including but not limited to port_1 308 and port_2 310. In some examples, the communication converter 306 can receive external sensor data, commands (e.g., from the pilot, autopilot, or flight computer), power, or can be used for various communications, such as diagnostics and/or firmware or software updates to the transponder 300.

In some examples, the transponder 300 can receive input from a squat sensor 312, which can provide an indication of whether the aircraft associated with the transponder 300 is on the ground or in the air. In some instances, the squat sensor 312 can be implemented as an automatic "weight-on-wheels" sensor. In some instances, the squat sensor 312 can represent an interface for a squat sensor, which can be commanded directly via squat sensor 312, or provided via command (e.g., from the pilot, autopilot, or flight computer). In some instances, the squat sensor 312 may be disabled (e.g., upon receipt of command from the pilot, autopilot, or flight computer, such as from a setting in the non-volatile memory).

In some instances, the transponder 300 can include a reference oscillator 314. For example, the reference oscillator can generate a 10 MHz (megahertz) clock signal and provide the clock signal to the controller 302, as illustrated. Of course, the reference oscillator can represent any value and is not limited to 10 MHz.

Further, the controller 302 can control one or more light emitting diodes (LED(s)) 316 to provide visual indications of the operation of the transponder 300. In some instances, the LEDs 316 can provide indications of power being on, valid sensor data provided, the device transmitting and/or receiving, as well as other functions.

In some embodiments, the transponder 300 can include a mutual suppress interface 318. For example, the mutual suppress interface 318 can output a signal when transmitting and/or can receive signals from other components of the aircraft to coordinate transmissions to prevent overlapping transmissions or to reduce interference. In some instances, the mutual suppress interface 318 can be a bidirectional interface, and in some instances, the mutual suppress interface 318 can be limited to one of sending or receiving. In some instances, at least partially in response to receiving a mutual suppress request via the mutual suppress interface 318, the transponder 300 can power down and/or delay transmission to reduce interference with other signals of the aircraft.

In some embodiments, the transponder 300 can further include a local oscillator (LO) 320, a transmit path 322, a receive path 324, an antenna path 326, a first single-pull double-throw (SPDT) switch 328, a second SPDT switch 330, and an antenna 332.

In some embodiments, the local oscillator (LO) 320 can include a phase lock loop/phase frequency detector (PLL/PFD) component 334 and a voltage controlled oscillator 336 (e.g., operating at 1090 MHz). In some instances, the PLL/PFD component 334 can receive programming instructions via a serial peripheral interface (SPI) from the controller 302, and can receive a clock signal (originating from the reference oscillator 314) from the integrated circuit 304. In some instances, based at least in part on the instructions from the controller 302 and from the clock from the integrated circuit 304, the LO 320 can generate a radio frequency signal and output the signal to the first SPDT switch 328. Although discussed in the context of the voltage controlled oscillator 336 generating a signal with a frequency of 1090 MHz, any frequency can be utilized herein. In some instances, the transponder 300 can include multiple local oscillators 320, PLL/PFD components 334, and/or voltage controlled oscillators 336 operating at a variety of frequencies, in accordance with various implementations.

In some instances, the SPDT switch 328 can receive a control signal from the integrated circuit 304 to selectively enable the transmit path 322 or the receive path 324, for example. When the SPDT switch 328 is controlled to transmit a signal, the SPDT switch 328 can couple the LO 320 to the transmit path 322, and when the SPDT switch 328 is controlled to receive a signal, the SPDT switch can couple the LO 320 to the receive path 324. In some embodiments, the SPDT Switch 328 could be replaced with a passive RF power divider, including but not limited to a power splitter (e.g., 3-dB splitter), directional coupler (e.g., 10-dB coupled/1-dB output), or tapper. In some instances, various components including a SPDT switch, passive dividers, a power splitter, a directional coupler, or a tapper can be referred to generally as distribution components.

In some embodiments, the transmit path 322 can include, but is not limited to, one or more transmit amplifier(s) 338, a driver amplifier 340, and a power amplifier 342. In some instances, the transmit amplifier (e.g., Tx amplifier) 338 can be coupled to the SPDT switch 328 and the driver amplifier 340; the driver amplifier 340 can be coupled to the transmit amplifier 338 and the power amplifier 342; and the power amplifier 342 can be coupled to the driver amplifier 340 and the second SPDT switch 330. Further, in some instances, some or all of the components of the transmit path 322 can be selectively enabled or disabled by an enable line controlled by the integrated circuit 304 and/or by the controller 302.

Further, in some instances, the transmit amplifier 338 can be powered by a constant current source, discussed below in connection with FIG. 13.

In some instances, the driver amplifier 340 and the power amplifier 342 can include additional modulation control, discussed below in connection with FIGS. 12A and 12B, respectively.

In general, the transmit amplifier 338, the driver amplifier 340, and power amplifier 342 can progressively amplify a signal to be output by the transponder 300.

In some embodiments, the second SPDT switch 330 can selectively couple the antenna path 326 to the transmit path 322 or the receive path 324 in response to a control signal from the integrated circuit 304 or from the controller 302, for example.

In some instances, the antenna path 326 can include a filter 344 (e.g., a low pass filter) and a filter 346 (e.g., a bandpass filter, a notch filter, etc.), for example. In some instances, the filter 346 can be configured to filter frequencies associated with a GPS receiver, for example. Further, in some instances, the filter 344 can be configured to attenuate frequencies below the transmission frequencies (e.g., 1090 MHz) and the reception frequencies (e.g., 1030 MHz). Further, in some instances, the SPDT Switch 330 may be considered in combination with a limiter 348 to implement additional filtering at even harmonics of the transmission frequencies (e.g., 1090 MHz).

In some instances, the antenna 332 can represent an internal antenna to the transponder 300 and/or can represent an external antenna coupled to the transponder 300. In some examples, the transponder 300 may include one or more ports adapted to couple the transponder 300 with one or more external antennas.

In some embodiments, the receive path 324 can include a limiter 348 coupled to the SPDT switch 330 and a receive filter 350; the receive filter 350 coupled to the limiter 348 and an amplifier 352; the amplifier 352 coupled to the receive filter 350 and an image reject filter 354; the image reject filter 354 coupled to the amplifier 352 and a mixer 356; the mixer 356 coupled to the image reject filter 354 and an intermediate frequency (IF) filter 358; the IF filter 358 coupled to the mixer 356 and a log detect 360; the log detect 360 coupled with the IF filter 358 and an analog-to-digital converter (ADC) 362; and the ADC 362 coupled to the log detect 360 and the integrated circuit 304. Of course, the receive path 324 (and the transmit path 322 and the antenna path 326) may include more or fewer components than those illustrated in FIG. 3A, and can be arranged in any order. In some instances, the transponder 300 can include multiple receive paths 324 coupled to different antennas (e.g., for diversity (redundancy), or to receive signals from different directions (direction-finding)).

In some instances, the limiter 348 can include one or more components to prevent powerful radio frequency signals from damaging one or more components of the transponder 300. For example, the limiter 348 can include one or more dual quarter-wave and/or halfwave structures to direct harmful signals away from sensitive components of the transponder 300 to improve survivability, as discussed herein. Additional details of the limiter 348 are discussed in connection with FIGS. 11A and 11B.

In some instances, the receive filter 350 can filter (e.g., attenuate) signals outside the designed receiving frequency (e.g., 1030 MHz). In some instances, the filter 350 can be a bandpass filter or a surface acoustic wave (SAW) filter.

In some instances, the amplifier 352 can be a low-noise amplifier configured to amplify the received signal.

In some instances, the image reject filter 354 can be used to further filter the received signal prior to passing the received signal to the mixer 356.

In some instances, the mixer 356 receives the output from the local oscillator 320 at a time in which the SPDT switch 328 enables the receive path 324. In some instances, the signal received from the local oscillator 320 corresponds to a 1090 MHz signal, while the received signal (e.g., received via the antenna 332) corresponds to a 1030 MHz signal. In some instances, the mixer 356 can determine an intermediate frequency (IF) signal based at least in part on a difference between the first signal from the local oscillator 320 and a second signal received from the antenna 332.

In some instances, the intermediate frequency (IF) filter 358 can receive the intermediate frequency from the mixer 356, filter the signal, and pass the filtered signal to the log detect 360. In some instances, the IF filter 358 can correspond to a SAW filter and/or a bandpass filter.

In some instances, the log detect 360 can include a demodulating logarithmic amplifier with received signal strength indicator (RSSI) associated with the filtered IF signal. In some instances, the log detect 360 can include a limiter output associated with the filtered IF signal.

In some instances, the ADC 362 can receive the signal from the log detect 360 to convert the analog RSSI signal to a digital signal for input to the integrated circuit 304.

Figure 3B:
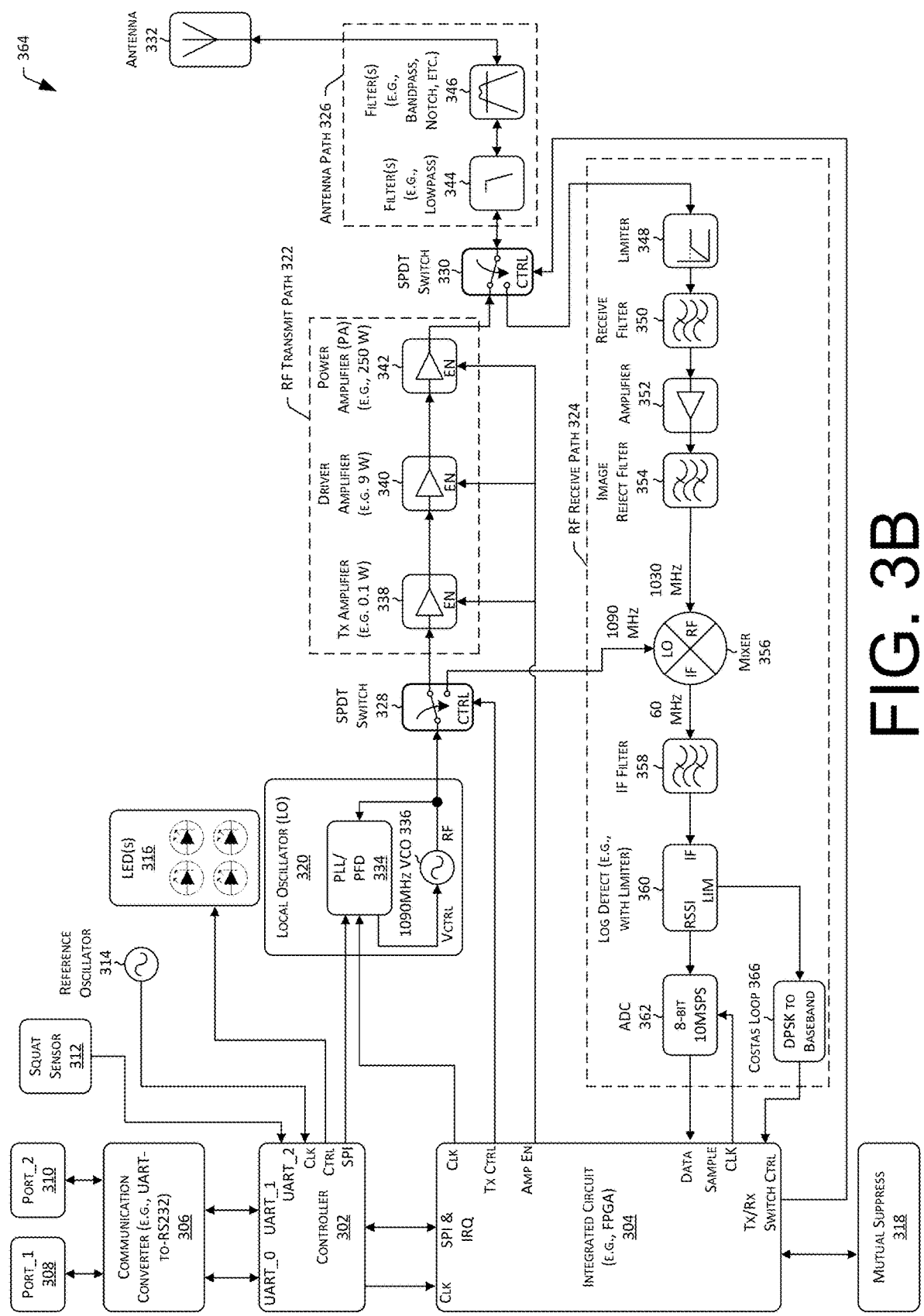
FIG. 3B illustrates a graphic representation of components of another example transponder (e.g., in accordance with a Mode S communication standard, and/or supporting ADS-B and/or TABS functionality).

FIG. 3B illustrates a graphic representation of components of another example transponder 364 (e.g., in accordance with of a Mode S communication standard). In some instances, the transponder 364 can substantially correspond to the transponder 300, with the addition of a Costas loop 366 in the receive path 324. In some instances, the Costas loop 366 can perform processing on the received signal to determine a phase shift associated with the signal. In some instances, the Costas loop 366 can represent a phase-frequency detector (PFD) based circuit which can be used for coherent carrier frequency recovery for phase modulated signals (e.g., DPSK, BPSK). In some instances, the Costas loop 366 can provide a binary indication of a phase shift to the integrated circuit 304, thereby minimizing the logic (e.g., firmware or software) required by the integrated circuit 304. Additional details of one implementation of the Costas loop 366 are provided in connection with FIGS. 15A and 15B.

Figure 4A:
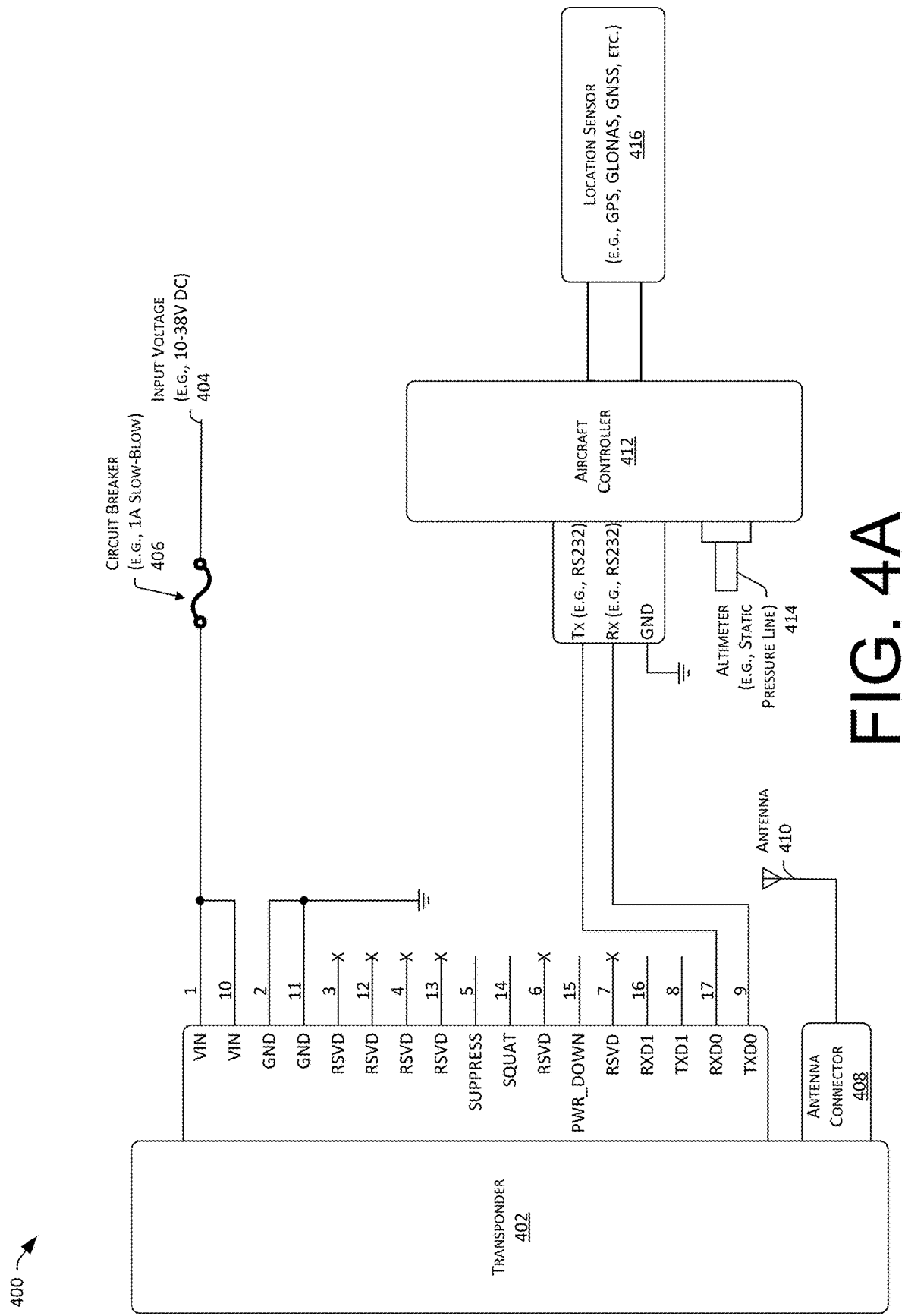
FIG. 4A illustrates an example interconnect diagram for a transponder on an aircraft.

FIG. 4A illustrates an example interconnect diagram 400 for a transponder 402 on an aircraft. In some examples, the transponder 402 can receive electrical power via an input voltage 404. In some cases, the input voltage 404 can be between 10-38 V DC. In some instances, the transponder 402 can be protected from excessive current by a circuit breaker 406, which can be implemented as a 1 Amp slow-blow fuse. In some instances, any values of fuses or circuit breakers can be used. As discussed herein, the transponder 402 can include an antenna connector 408 to couple an antenna 410 to the transponder 402.

As illustrated, in some instances, the input voltage 404 can be input to the transponder at pins 1 and 10. The transponder can be connected to ground via pins 2 and 11. From top to bottom, pins 3, 12, 4, 13, 6, and 7 can be reserved for future use on the transponder 402. Pins 17 and 9 of the transponder 402 can be coupled to transmit and receive signal lines of an aircraft controller 412. In some instances, the transmit signal line is labeled by "Tx (e.g., RS232)" and the receive signal line is labeled by "Rx (e.g., RS232)," indicating that the aircraft controller 412 can be communicatively coupled with the transponder 402 via a RS232 connection. However, any communication protocol can be used, and is not limited to an RS232 protocol. The aircraft controller 412 can receive data from an altimeter (e.g., a static pressure line) 414, and the aircraft controller 412 can receive data from a location sensor (e.g., GPS, GLONAS, GNSS, etc.).

Figure 4B:
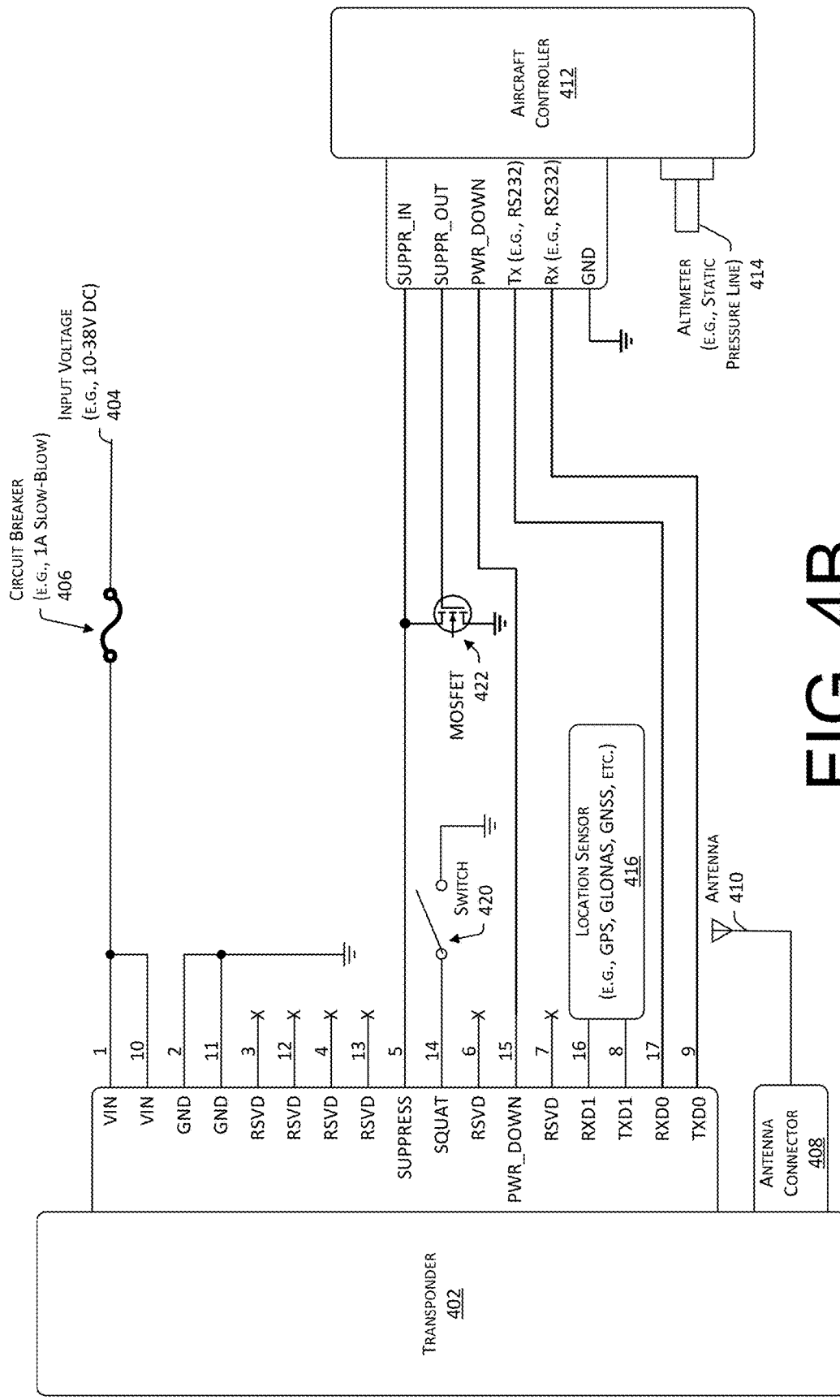
FIG. 4B illustrates another example interconnect diagram for a transponder on an aircraft.

FIG. 4B illustrates another example interconnect diagram 418 for a transponder on an aircraft. In some instances, the diagram 418 represents an alternate implementation for installing the transponder 402 on an aircraft. In the diagram 418, the location sensor 416 can be directly coupled to pins 16 and 18 of the transponder. Further the aircraft controller 412 can remain coupled with the transponder 402 via the transponder pins 17 and 9.

In some instances, a switch 420 can be coupled to pin 14 of the transponder. In some instances, the switch 420 can correspond to a weight-on-wheels sensor to determine when the aircraft is on the ground or is airborne. Further, pin 5 of the transponder 402 can be coupled to the aircraft controller 412 via a "SUPPR_IN" input, while pin 15 of the transponder 402 can be coupled to the "PWR_DOWN" input of the aircraft controller 412. Further, pin 5 of the transponder 402 can be coupled to an N-Channel MOSFET 422, whereby a gate of the MOSFET 422 can be coupled to a "SUPPR_OUT" input of the aircraft controller 412. The "SUPPRESS" input of the transponder 402 can operate in conjunction with the MOSFET 422 and the "SUPPR_IN" and "SUPPR_OUT" pins of the aircraft controller 412 to indicate when a component intends to transmit and when a component instructs other components to remain "silent" during such transmissions. For example, the "SUPPRESS" pin 5 of the transponder 402 can send and/or receive a signal to/from the aircraft controller 412 to pause or postpone at least one transmission to minimize interference with other transmissions. The "PWR_DOWN" pin 15 of the transponder 402 can receive an instruction to power the transponder 402 down to a low-power state.

Figure 5A:
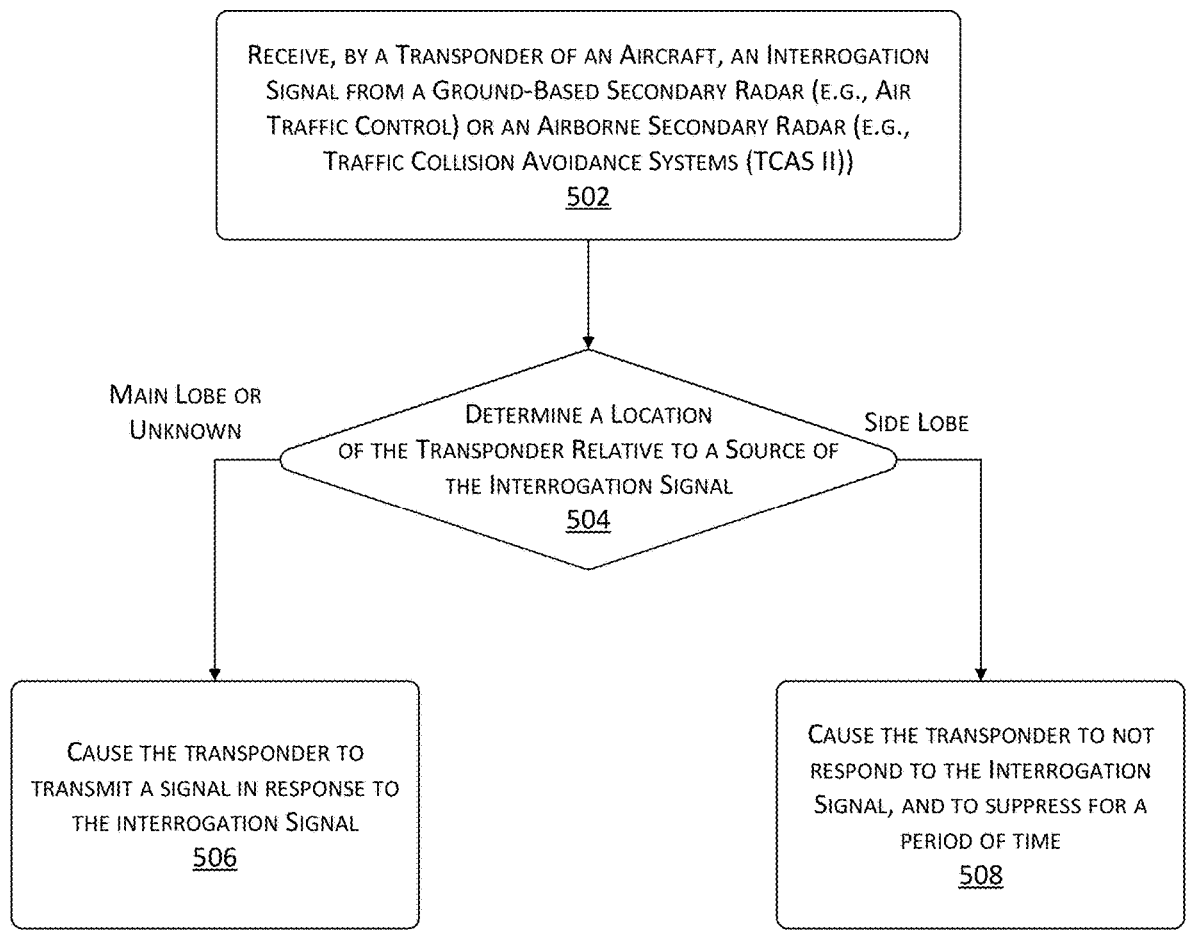
FIG. 5A shows an example process for a transponder configured to operate in a Mode A or Mode C communication mode.
Figure 5B:
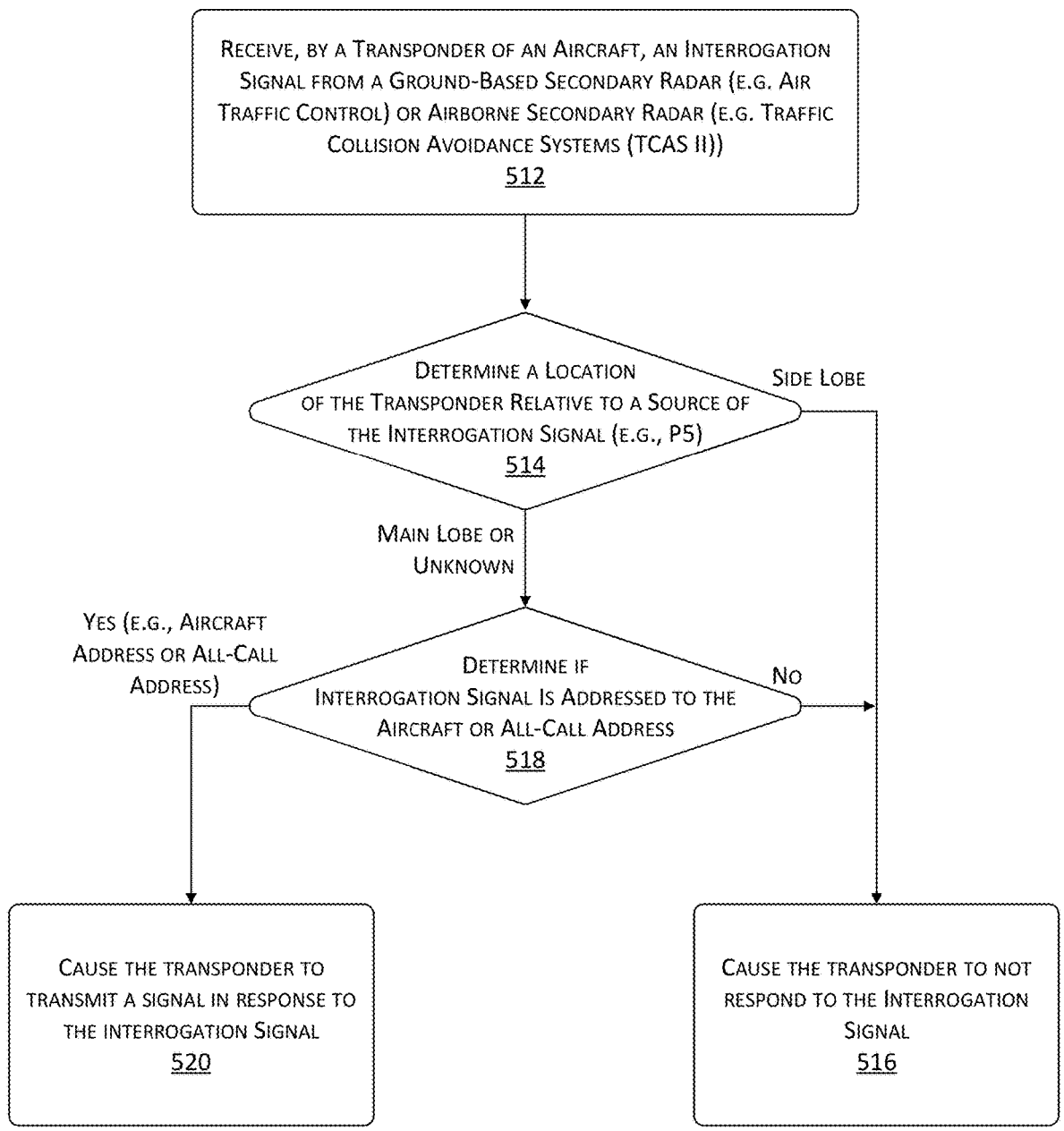
FIG. 5B shows an example process for a transponder (or a traffic awareness beacon system (TABS)) configured to operate in a Mode S communication mode.

FIGS. 5A and 5B illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5A shows an example process 500 for a transponder configured to operate in a Mode A or Mode C communication mode. In some instances, some or all of the operations in the process 500 can be performed the transponders 104, 202, 300, 364, and 402, as discussed herein.

At operation 502, the process can include receiving, by a transponder of an aircraft, an interrogation signal from a ground-based radar (e.g., air traffic control) or an airborne radar (e.g., a traffic collision avoidance system (TCAS)).

At operation 504, the process can include determining a location of the transponder relative to a source of the interrogation signal. For example, the operation 504 can include determining if the transponder is in a main lobe of the received signal, if the transponder is in a side lobe of the received signal, or if the location is unknown. If the operation 504 determines that the transponder is in the main lobe of the received signal, or if the transponder location is unknown, the processing continues to the operation 506. If the operation determines that the transponder is in a side lobe of the received signal, the processing continues to the operation 508. In some instances, the operation 504 can include determining a phase shift of one or more received interrogation signals and/or determining a relative difference in power between one or more received interrogation signals.

At operation 506, the process can include causing the transponder to transmit a signal at least partially in response to the interrogation signal. For example, the operation 506 can include capturing sensor data associated with the aircraft (e.g., identity information, altitude, speed, heading, location, etc.) and transmitting the signal including at least a portion of the aforementioned data.

At operation 508, the operation can include causing the transponder to not respond to the interrogation signal.

As can be understood, the process 500 can include controlling one or more components of the transponder (e.g., the transponder 300 or 364) to enable a receive path and a transmit path at an appropriate time. In some instances, switching the transponder to a transmit operation can include enabling the transmit amplifier(s) and selectively driving one or more SPDT switches to couple a transmit path with a local oscillator and/or an antenna path. Conversely, switching the transponder to a receive operation can include disabling the transmit amplifier(s) and selectively driving one or more SPDT switches to couple a receive path to the local oscillator and/or the antenna path. These and other operations are considered in the scope of the process discussed in FIGS. 5A and 5B, as discussed herein.

FIG. 5B shows an example process 510 for a transponder (or a traffic awareness beacon system (TABS)) configured to operate in a Mode S communication mode. In some instances, some or all of the operations in the process 500 can be performed the transponders 104, 202, 364, and 402, as discussed herein.

At operation 512, the process can include receiving, by a transponder of an aircraft, an interrogation signal from a ground-based radar (e.g., air traffic control) or an airborne radar (e.g., a traffic collision avoidance system (TCAS)).

At operation 514, the process can include determining a location of the transponder relative to a source of the interrogation signal. For example, the operation 514 can include determining if the transponder is in a main lobe of the received signal, if the transponder is in a side lobe of the received signal, or if the location is unknown. If the operation 514 determines that the transponder is in the main lobe of the received signal, or if the transponder location is unknown, the processing continues to the operation 518. If the operation determines that the transponder is in a side lobe of the received signal, the processing continues to the operation 516. In some instances, the operation 518 can include determining a phase shift of one or more received interrogation signals and/or determining a relative difference in power between one or more received interrogation signals.

At operation 518, the process can include determining if the interrogation signal is addressed to the aircraft or if the interrogation signal is an all-call interrogation signal (e.g., any transponder can respond). In some instances, the operation 518 can include decoding the interrogation signal to determine an addressed aircraft and comparing the addressed aircraft to an identity of the aircraft to determine if they are the same. If the interrogation signal is not addressed to the aircraft, or the interrogation signal is not an all-call interrogation signal (e.g., "No" in operation 518), the processing continues to operation 516, whereby the transponder is caused not to respond to the interrogation signal. If the interrogation signal is addressed to the aircraft, or the interrogation signal is an all-call interrogation signal (e.g., "Yes" in operation 518), the processing continues to operation 520.

At operation 520, the process can include causing the transponder to transmit a signal in response to the interrogation signal. For example, the operation 520 can include capturing sensor data associated with the aircraft (e.g., identity information, altitude, speed, heading, location, etc.) and transmitting the signal including at least a portion of the aforementioned data. As another example, the operation 520 may include extrapolating sensor data associated data with the aircraft (e.g., position) and transmitting the extrapolated data.

Figure 6:
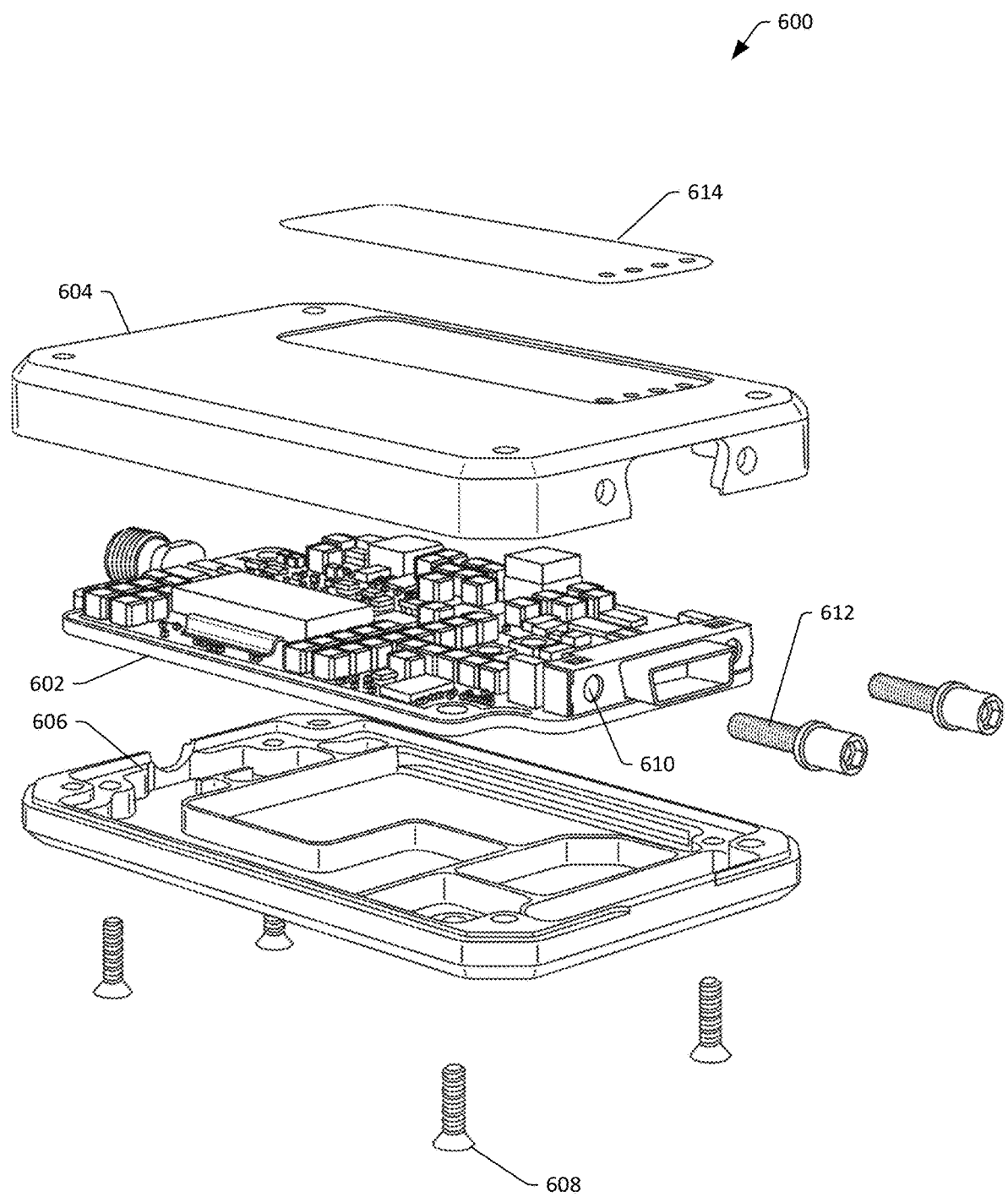
FIG. 6 shows an exploded view of an example transponder.

FIG. 6 shows an exploded view 600 of a transponder. In some examples, a printed circuit board 602 including one or more components of the transponder can be installed in a housing including a top portion 604 and a bottom portion 606. In some instances, the housing may include a shield to direct or block RF signals (e.g., a Faraday cage). The printed circuit board 602, the top portion 604, and the bottom portion 606 can be coupled via one or more fasteners 608.

In some examples, an input portion 610 of the transponder can include fasteners to securely couple a fastener 612 associated with a communications or power cable(s). The transponder can further include a label 614 to present information, such as FCC or FAA information associated with the transponder. Further, the label 614 can include indications that, together with one or more light emitting diodes (LEDs) of the transponder, provide indications to users regarding a state of the transponder (e.g., on, off, transmitting, receiving, error, etc.).

Figure 7A:
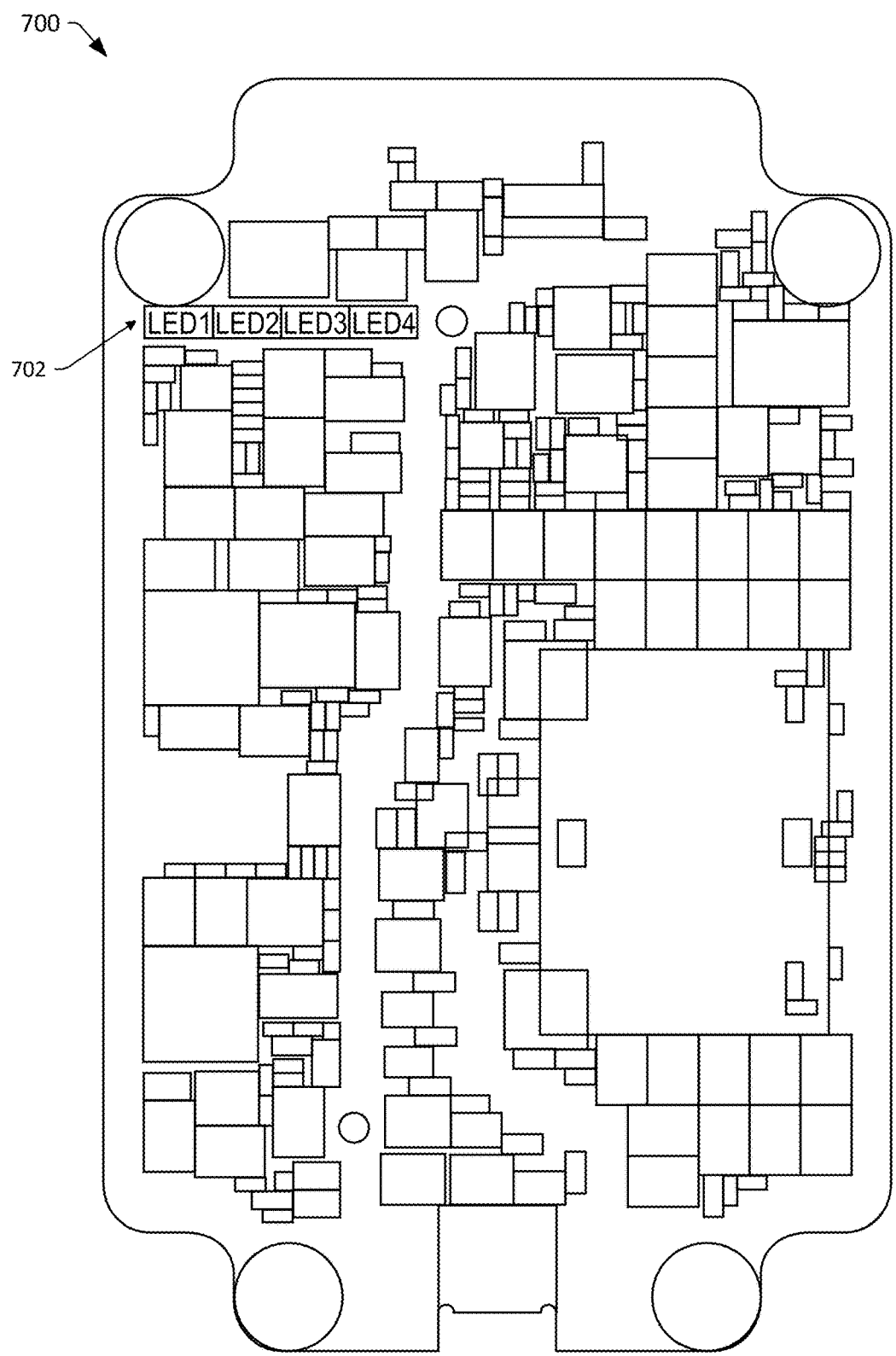
FIG. 7A illustrates a top view of a component layout of an example transponder, including light emitting diodes (LEDs) of the example transponder.

FIG. 7A illustrates a top view of a component layout 700 of an example transponder, including light emitting diodes (LEDs) of the example transponder. The example component layout 700 of the transponder depicts positions of the various LEDs on the transponder. For example, the four user-configurable LEDs 702 are positioned near a top of the component layout such that they remain visible even when the housing is put in place. Further, individual squares or rectangles in the component layout 700 illustrate a density of the components in the transponder.

Figure 7B:
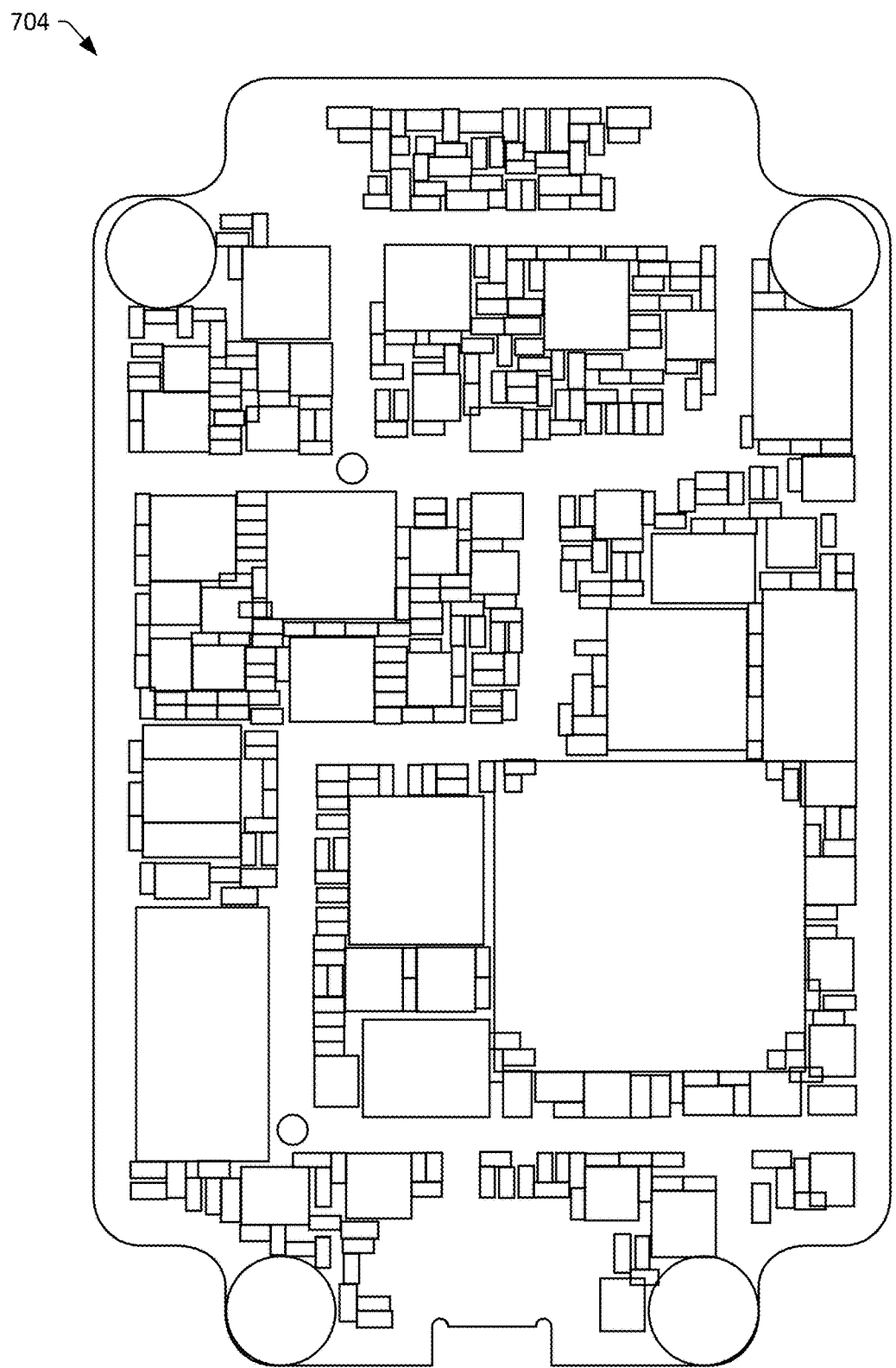
FIG. 7B illustrates a bottom view of a component layout of an example transponder.

FIG. 7B illustrates a bottom view of a component layout 704 of an example transponder. Thus, FIGS. 7A and 7B collectively illustrate a representative number and density of components implemented in the transponder.

Figure 8E:
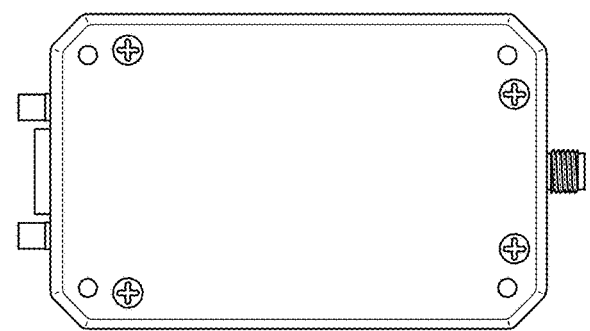
FIGS. 8A-8E illustrates various example exterior views of an example transponder.
Figure 8D:
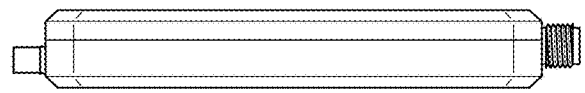
Figure 8A:
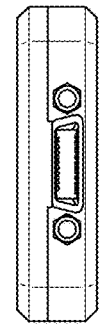
Figure 8B:
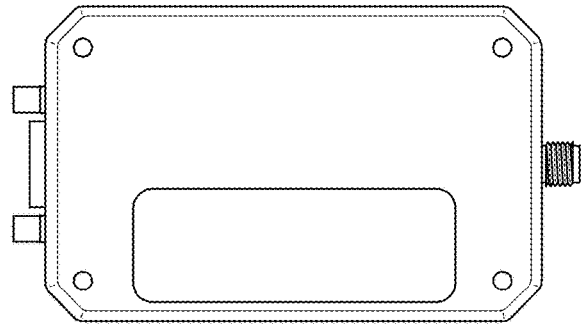
Figure 8C:
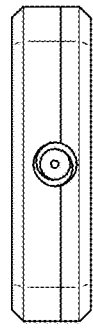

FIGS. 8A-8E illustrates various example exterior views of an example transponder 800. For example, FIG. 8A illustrates a top view of the transponder 800, including a port for transmitting and/or receiving data and/or power. FIG. 8B illustrates a front view of the transponder 800, including the externally-visible LEDs and label with model number and manufacturing information. FIG. 8C illustrates a bottom view of the transponder 800, including a coaxial port for coupling the transponder 800 to one or more antennas for transmitting and/or receiving wireless data. FIG. 8D illustrates a side profile (e.g., right side) of the transponder 800, while FIG. 8E illustrates a back view of the transponder 800. In some instances, the transponder 800 can correspond to the transponder 104, 202, 300, 364, and 402, for example.

Figure 9:
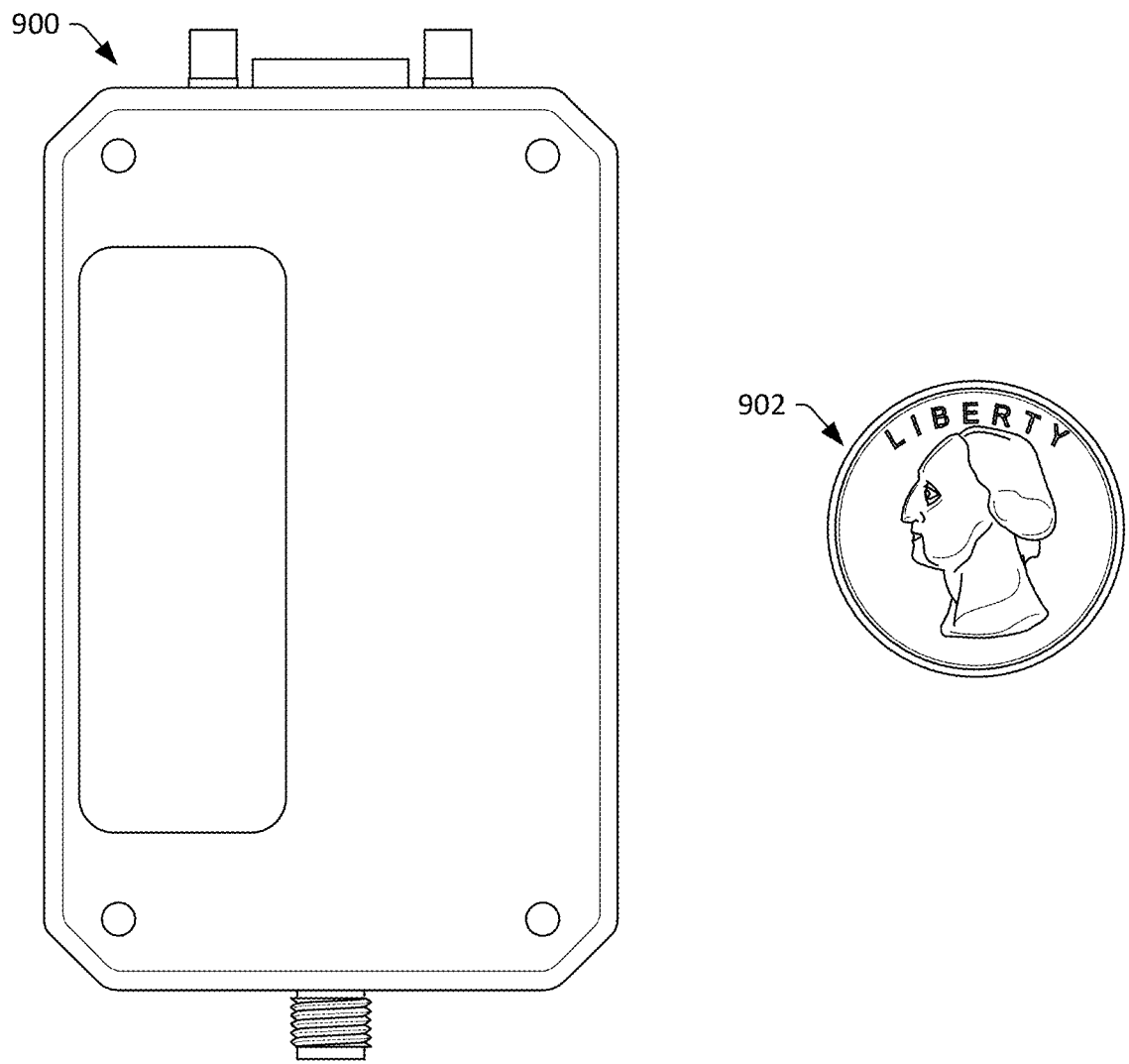
FIG. 9 illustrates the small form factor of an example transponder relative to a quarter to give reference as to the small size of the example transponder.

FIG. 9 illustrates the small form factor of a transponder 900, such as the transponders 104, 202, 300, 364, and 402, relative to a quarter 902 to give reference as to the small size of the transponder 900.

Figure 10A:
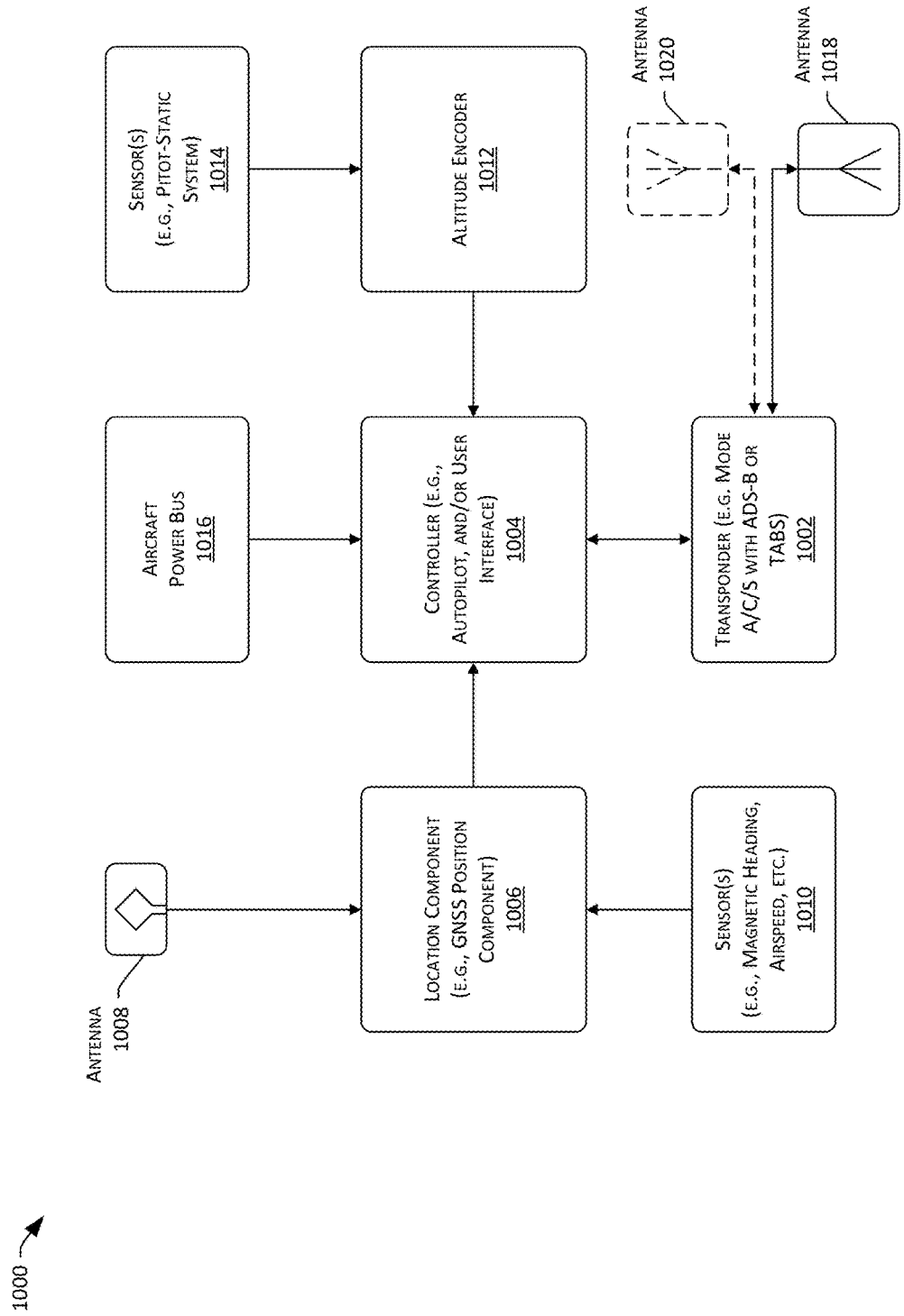
FIG. 10A shows an example block diagram of aircraft components including an example transponder and associated systems, shown with data flowing through a controller.

FIG. 10A shows an example block diagram 1000 of aircraft components including a transponder 1002 and associated systems, shown with data flowing through a controller 1004. Further, the aircraft components can include a location component (e.g., a GNSS position component) 1006 receiving data via an antenna 1008 and/or from one or more sensor(s) 1010. In some instances, the one or more sensors 1010 can further include a magnetic heading sensor, an airspeed sensor, an altitude sensor, a weather sensor, a temperature sensor, and the like. In some instances, data from the one or more sensors 1010 can be simply passed along to the controller 1004. In some instances, the controller 1004 and/or the location component 1006 can perform sensor fusion (e.g., for dead reckoning). In this example block diagram 1000, the location component 1006 can be directly coupled to the controller 1004 via a serial interface (e.g., RS232) or the like. Further, the aircraft components can include an altitude encoder 1012, which can receive sensor data from one or more sensors 1014, such as a pitot-static system. The altitude encoder 1012 can be directly coupled to the controller 1004 via a serial interface, parallel gray code, or the like. The controller 1004 can further receive electrical power from an aircraft power bus 1016. The transponder 1002 can transmit and/or receive signals via one or more antennas 1018 and 1020. In some instances, the antenna 1018 can be mounted on a bottom of the aircraft, while an optional antenna 1020 can be mounted on a top of the aircraft (e.g., to implement antenna diversity). In some instances, the controller 1004 can represent an autopilot and/or user interface, and can receive information from the location component 1006 and the altitude encoder 1012 and provide (and/or receive) information to or from the transponder 1002.

Figure 10B:
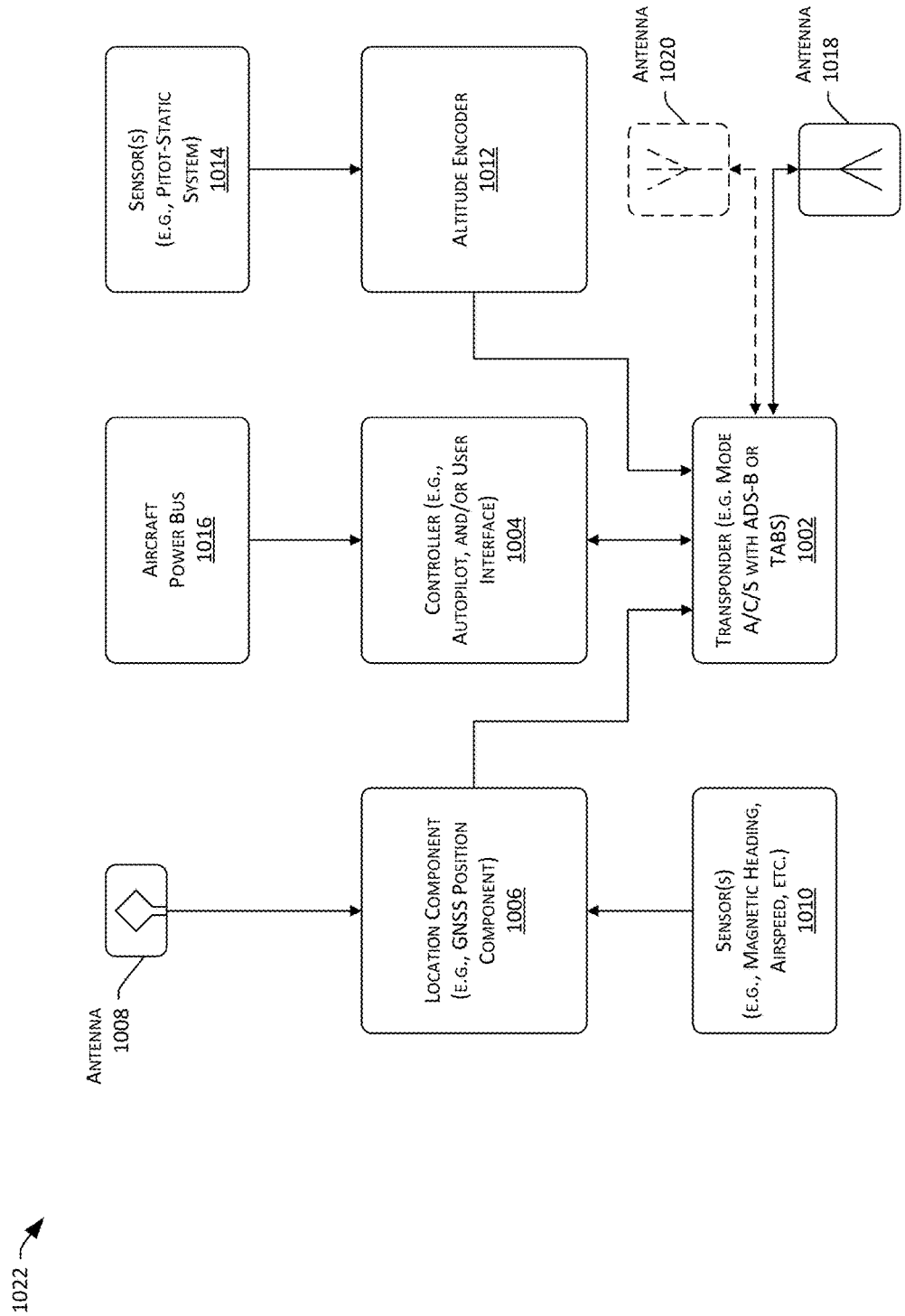
FIG. 10B shows another example block diagram of aircraft components including an example transponder and associated systems, shown with data transmitted directly to the example transponder.

FIG. 10B shows another example block diagram 1022 of aircraft components including a transponder and associated systems, shown with sensor data transmitted directly to the transponder. For example, the location component 1006 can be directly coupled with the transponder 1002 via a serial connection (e.g., RS232), or the like. Further, the altitude encoder 1012 can be directly coupled with the transponder 1002 via a serial connection, or the like. The controller 1004 can receive information from the location component 1006 and/or from the altitude encoder 1012 via the transponder 1002.

Figure 11A:
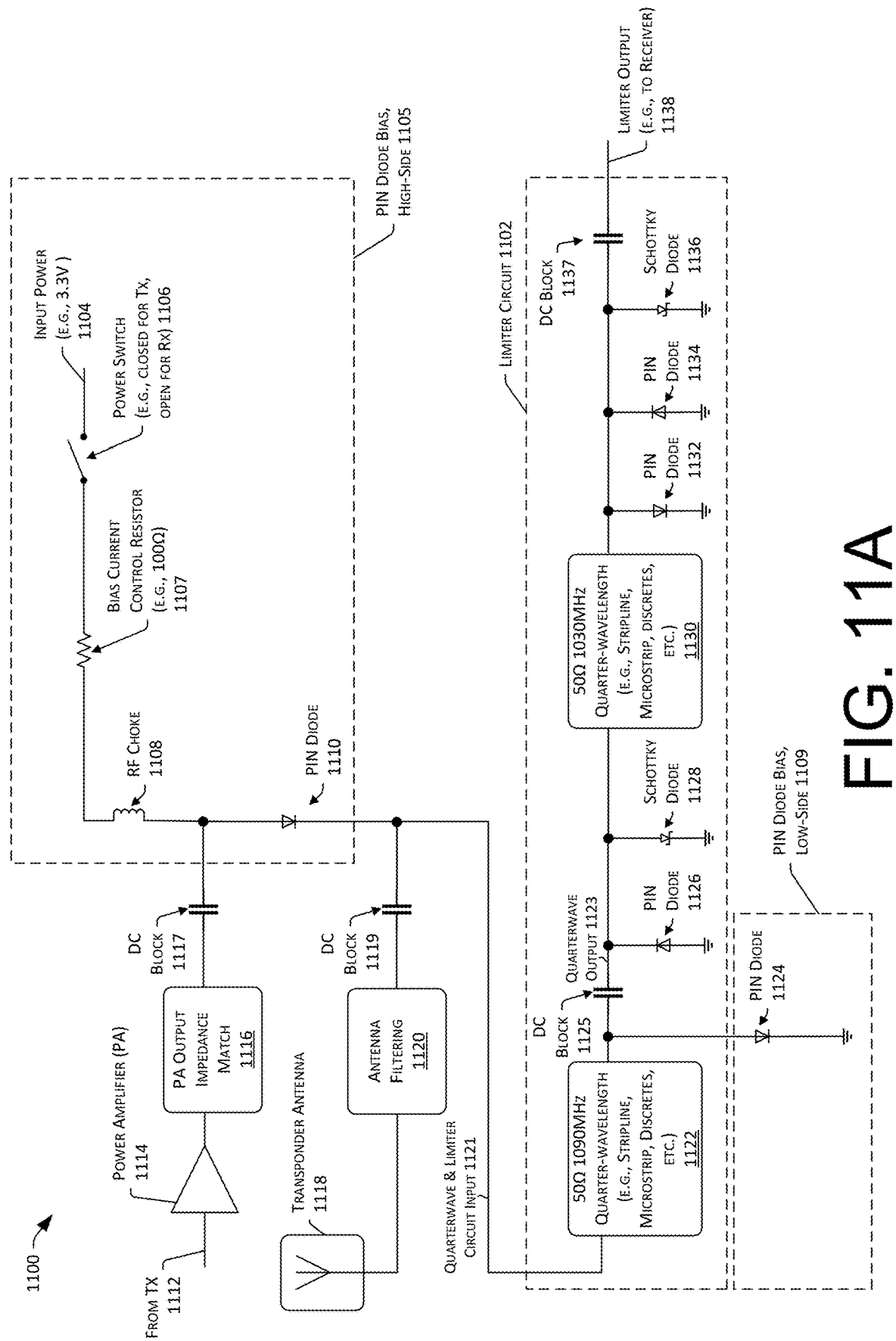
FIG. 11A illustrates example components of a limiter circuit with additional transmitter-side components used to implement survivability.

FIG. 11A illustrates example components 1100 of a limiter circuit 1102 used to implement survivability, as discussed herein. In some instances, aspects of the limiter circuit 1102 can correspond to the limiter 348 of FIGS. 3A and 3B. In some instances, aspects of a power switch 1106, a RF choke 1108, a PIN diode 1110, a 50 Ω 1090 MHz quarter-wave 1122, and a PIN diode 1124 can correspond to the SPDT switch 330 of FIGS. 3A and 3B. In some instances, aspects of the power switch 1106, the RF choke 1108, the PIN diode 1110, the 50 Ω 1090 MHz quarter-wave 1122, and the PIN diode 1124 can contribute to the overall filtering of the filter 344 and the filter 346 of FIGS. 3A and 3B.

In general, the limiter circuit 1102 can include functionality to attenuate high frequency signals and/or high-power signals that may be received by the transponder and that might otherwise damage one or more components of the transponder if not attenuated.

The example components include input power 1104 (e.g., 3.3 V, although any voltage may be used) coupled to a power switch 1106 (e.g. a PNP or P-channel MOSFET). In some instances, when the power switch 1106 is closed the transponder may transmit, while in some instances, when the power switch 1106 is open, the transponder may be configured to receive a signal. In some instances, the power switch 1106 can be controlled by the controller 302 and/or by the integrated circuit 304 of FIGS. 3A and 3B. The components 1100 further include an RF choke 1108 and a PIN diode 1110. Further, a transmit signal may be input via a transmit input 1112 coupled to a power amplifier (PA) 1114, and coupled to a PA output impedance match 1116. The components 1100 further include a transponder antenna 1118 and antenna filtering 1120 (which may correspond, at least in part, to the antenna path 326 of FIGS. 3A and 3B). In some instances, the PIN diode bias (e.g., high side) 1105 may be implemented as input power 1104, power switch 1106, and resistor 1107. In some instances, the PIN diode bias 1105 may instead be implemented as a constant current circuit using an active feedback control, similar to amplifier bias 1301, described later in FIG. 13.

The limiter circuit 1102 can include a first quarter-wavelength component (e.g., with an impedance of 50Ω at 1090 MHz, configured as a stripline, microstrip, or combination thereof) 1122, a PIN diode 1124 (configured with a cathode at ground), a PIN diode 1126 (configured with an anode at ground), and a Schottky diode 1128. Further, the limiter circuit 1102 can include a second quarter-wavelength component (e.g., with an impedance of 50Ω at 1030 MHz, configured as a stripline, microstrip, or combination thereof) 1130, a PIN diode 1132 (configured with a cathode at ground), a PIN diode 1134 (configured with an anode at ground), and a Schottky diode 1136. In some instances, in normal operations, the PIN diodes 1126 and 1134 remain off, while in some instances (e.g., experiencing high frequency or strong signals received by the transponder antenna 1118) the PIN diodes 1126 and 1134 and the Schottky diodes 1128 and 1136 can protect the circuit by diverting harmful signals to ground. Of course, the limiter circuit 1102 may include more or fewer components arranged in any order, in accordance with various implementations. In some embodiments, the first quarter-wavelength component 1122 and/or the second quarter-wavelength component 1130 may be implemented using discrete or "lumped element" components (e.g. a "pi" configuration including with one or more shunt capacitors and one or more series inductors). In some embodiments, the first quarter-wavelength component 1122 and/or the second quarter-wavelength component 1130 may be implemented using a combination of distributed (microstrip/stripline) and discrete (e.g., "lumped element") components. An output of the limiter circuit 1102 may be represented as an output 1138.

The limiter circuit 1102 can also include a DC block 1125 and a DC block 1137 to direct the antenna switch enable bias through the PIN diodes 1110 and 1124, and to further protect components of the transponder. In some instances, the implementation of the PIN diode 1124 in FIG. 11A can be referred to as a PIN diode bias (e.g., low side) 1109. In some instances, the limiter circuit 1102 can receive a quarterwave & limiter circuit input 1121 as an input. Further, in some instances, an output of the quarter-wavelength component 1122 and the DC block 1125 can be referred to as a quarterwave output 1123.

Further, the limiter circuit 1102 (and in particular, the quarter-wavelength component(s) 1122 and/or 1130) additionally function to filter out spurious transmissions centered around even-number harmonics of the transmitter carrier frequency (e.g., 2180 MHz (N=2), 4360 MHz (N=4), 6540 MHz (N=6), and the like). For example, when the power switch 1106 is closed, the PIN diode 1110 and 1124 will conduct resulting in low AC impedance with respect to AC ground (e.g., "real" ground or the power supply, which appears as ground to AC signals) at the DC block 1125. The quarter wavelength element 1122 may transform the AC short circuit at its output (e.g., at the DC block 1125) to an AC open circuit at its input (e.g., at the node shared with 1122 and 1120), which may cause the power amplifier 1114 and PA output impedance match 1116 to direct power through antenna filtering 1120 and to antenna 1118, thereby increasing the efficiency of the fundamental frequency transferred to the antenna 1118 from power amplifier 1114. Conversely, the even numbered harmonics may not experience the impedance transformation and may instead be directed towards the short circuit, attenuating them from the path to the transponder antenna 1118, thereby increasing the effectiveness of the filtering during transmit, and reducing spurious emissions. In some instances, the components 1110 can further include DC blocks 1117 and 1119 to provide further circuit isolation of DC signals.

Figure 11B:
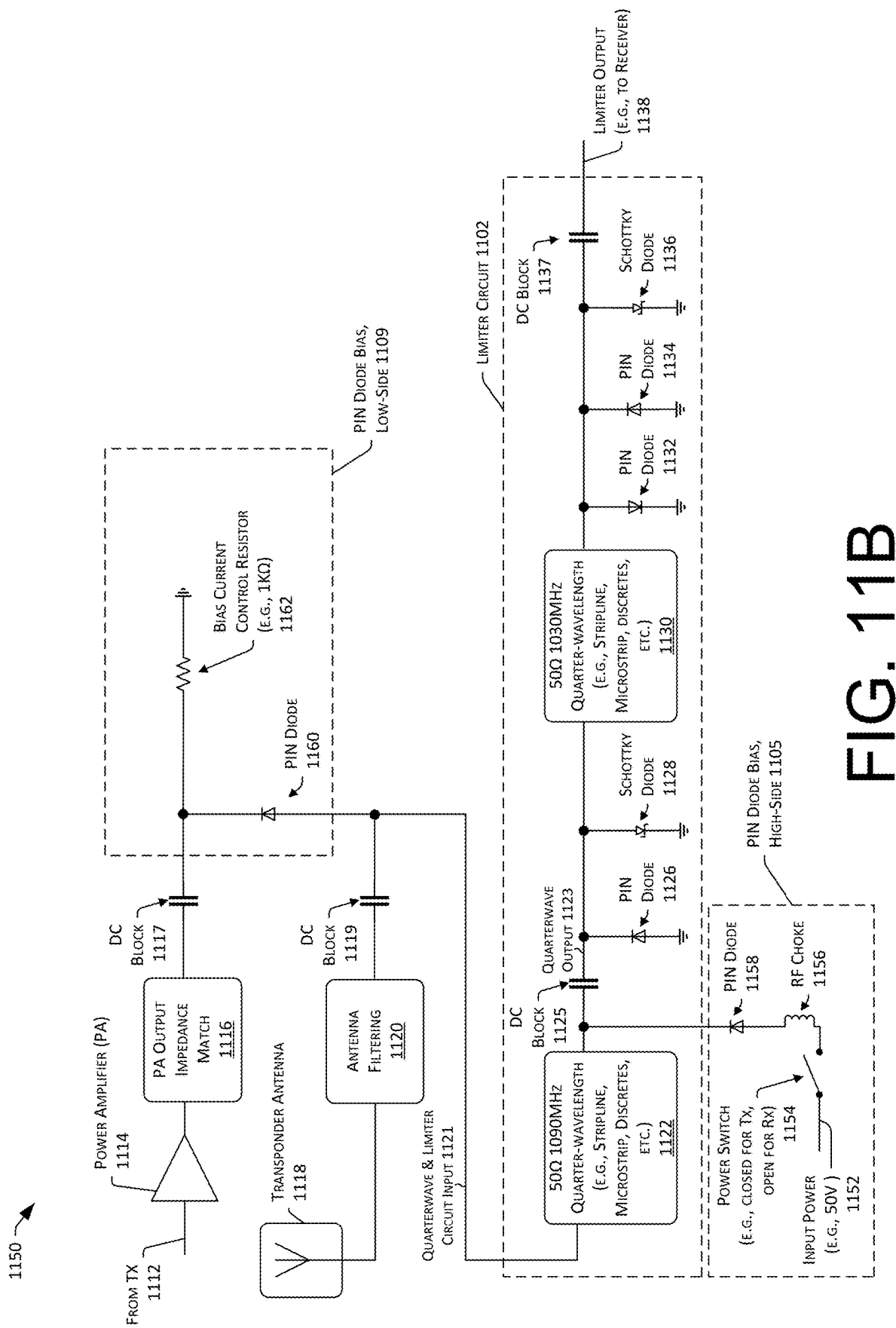
FIG. 11B illustrates example components of a limiter circuit with additional receiver-side components used to implement survivability.

FIG. 11B illustrates example components 1150 of a limiter circuit with additional receiver-side components used to implement survivability. For example, the example components 1150 including the limiter circuit 1102 receiving input (e.g., DC input current) on the RF receiver side of the antenna. For example, the components 1150 include an input power 1152, a power switch 1154, and a RF choke 1156 coupled to a PIN diode 1158. Further, the components 1150 include a PIN diode 1160, with the PIN diodes 1158 and 1160 having a reversed polarity, though substantially similar AC function, with respect to the PIN diodes 1124 and 1110, respectively, of FIG. 11A. Further, the components 1150 include a resistor 1162 coupled to the cathode of the PIN diode 1160 and to a ground (e.g., PIN diode low-side bias). In some instances, the implementation of the PIN diode 1160 and the bias current control resistor 1162 in FIG. 11B can be referred to as a PIN diode bias (e.g., low side) 1109. In some instances, the implementation of the power switch 1154, the RF choke 1156, and the PIN diode 1158 in FIG. 11B can be referred to as the PIN diode bias (e.g., high side) 1105.

Figure 12A:
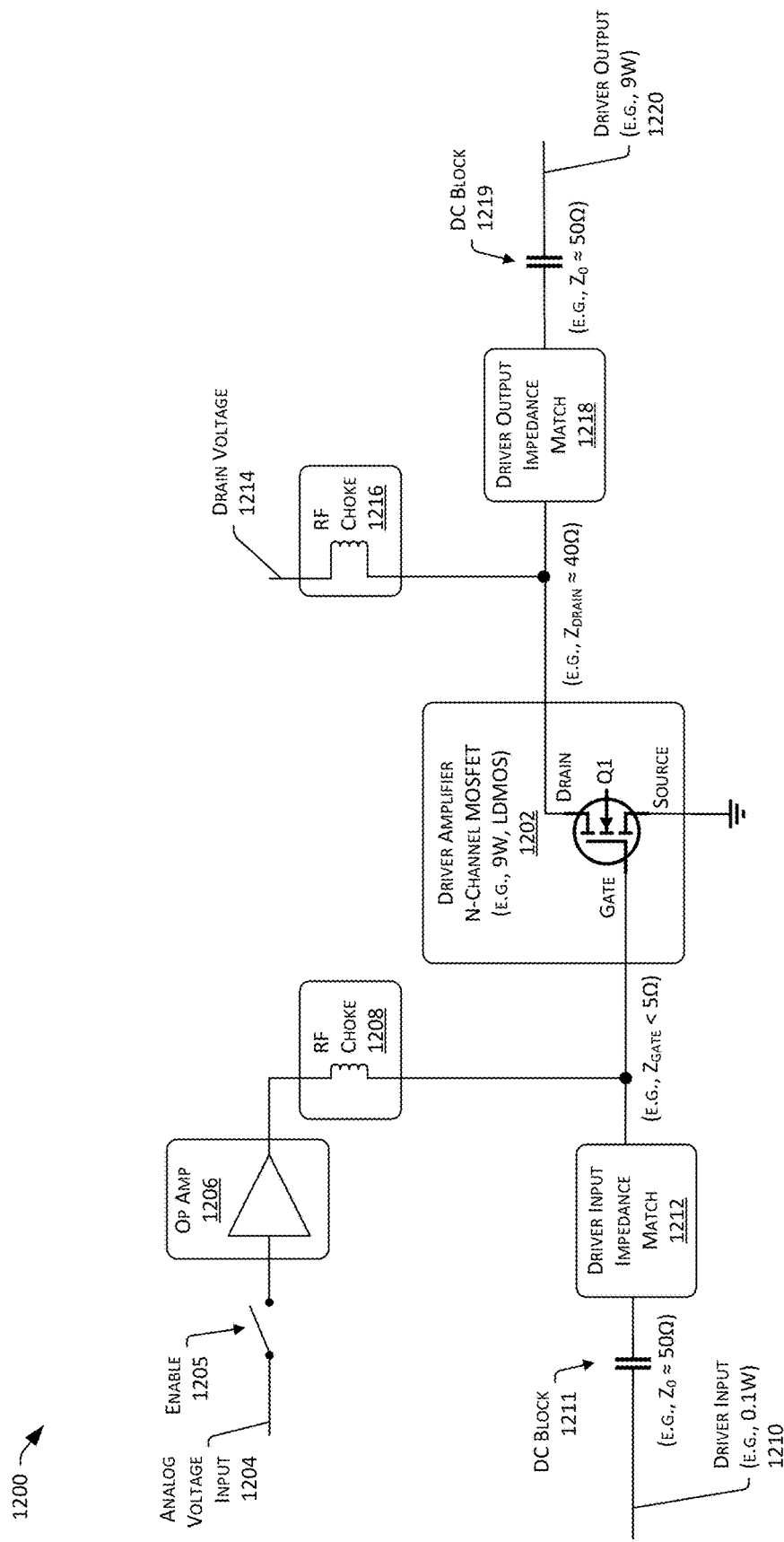
FIG. 12A illustrates example components of a direct gate modulation for a driver amplifier.

FIG. 12A illustrates example components 1200 of a direct gate modulation for a driver amplifier. For example, a driver amplifier 1202 may correspond to the driver amplifier 340 of FIGS. 3A and 3B. The configuration shown in FIG. 12A provides fast switching time, minimal power use, flexibility to adjust modulation parameters (e.g., pulse rise/fall times, pulse on time, etc.), and flexibility to compensate for temperature variation.

The example components 1200 further include an analog voltage input 1204 applied to an operational amplifier 1206. In some instances, the operational amplifier 1206 may have a gain of 2, although any value of gain may be used. In some instances, an enable 1205 may modulate a switch to enable (e.g., activate) or disable (e.g., deactivate) the operational amplifier 1206 (and accordingly, the components 1200). In some instances, the enable 1205 can correspond to the enable components discussed in connection with FIGS. 3A and 3B. The output of the operational amplifier 1206 may be provided to an RF choke 1208, which may in turn be coupled to the gate of the driver amplifier 1202.

Further, a driver input 1210 can be received, and an impedance match can be provided by an element 1212. A DC block 1211 can AC-couple the driver input 1210 signal to the driver input impedance match 1212, while blocking DC components of the signal, as illustrated. Thus, the driver amplifier 1202 can be controlled, at least in part, by the analog voltage input 1204, the driver input 1210, and/or the enable 1205.

A drain voltage 1214 can be coupled to an RF choke 1216, which in turn can be coupled to the drain of the driver amplifier 1202. The drain of the driver amplifier 1202 can be further coupled to a driver output impedance match 1218, the output of which can be provided as the driver output 1220. In some instances, the driver impedance match 1218 can be coupled to a DC block 1219, which in turn can be coupled to the driver output 1220.

Figure 12B:
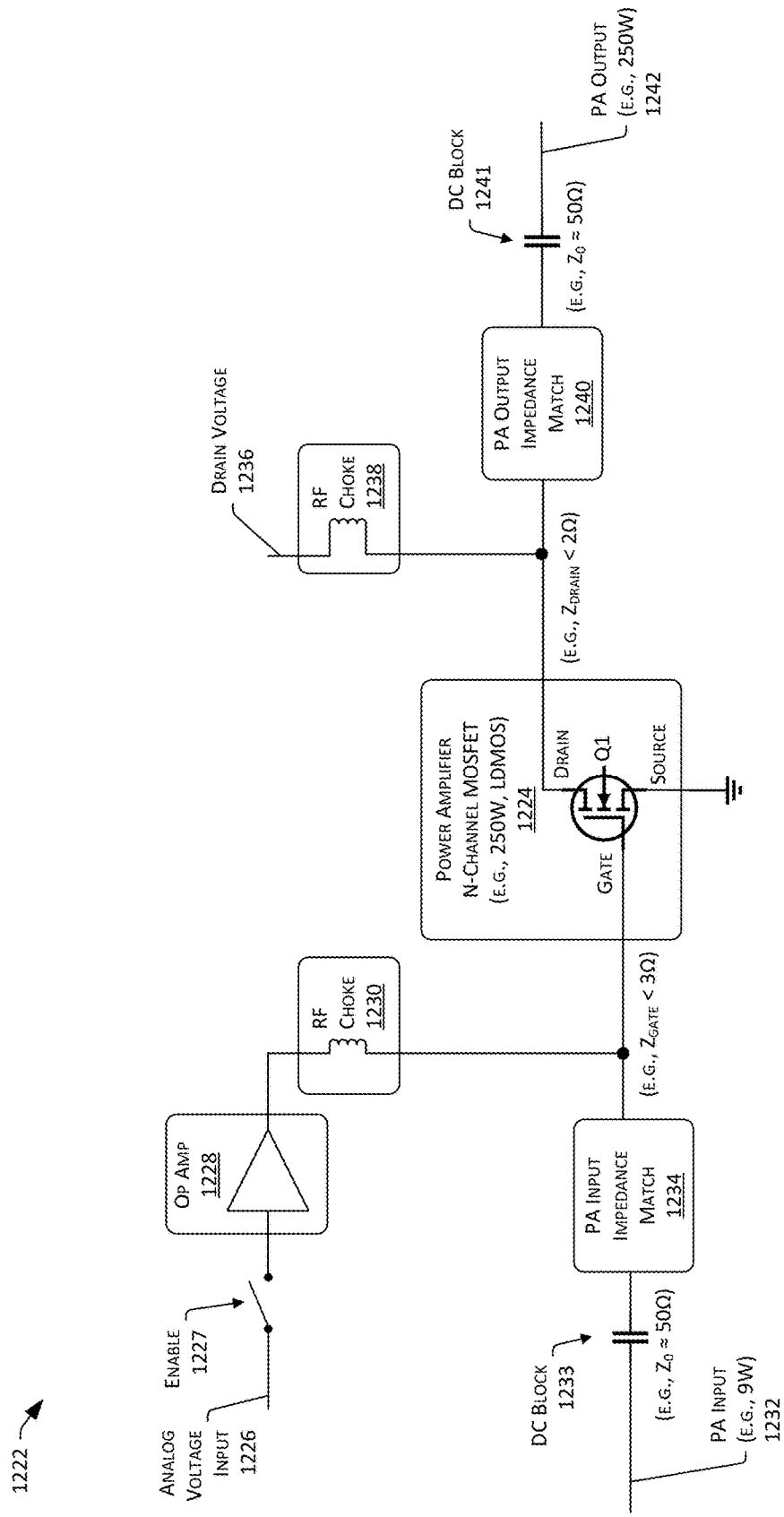
FIG. 12B illustrates example components for a direct gate modulation for a power amplifier.

FIG. 12B illustrates example components 1222 for a direct gate modulation for a power amplifier 1224. For example, the power amplifier 1224 may correspond to the power amplifier 342 of FIGS. 3A and 3B. The configuration shown in FIG. 12B provides fast switching time, minimal power use, flexibility to adjust modulation parameters (e.g., pulse rise/fall times, pulse on-duration, etc.), and flexibility to compensate for temperature variation.

The example components 1222 further include an analog voltage input 1226 applied to an operational amplifier 1228. In some instances, the operational amplifier 1228 may have a gain of 2, although any value of gain may be used. In some instances, an enable 1227 may modulate a switch to enable (e.g., activate) or disable (e.g., deactivate) the operational amplifier 1228 (and accordingly, the components 1222). In some instances, the enable 1227 can correspond to the enable components discussed in connection with FIGS. 3A and 3B. The output of the operational amplifier 1228 may be provided to an RF choke 1230, which may in turn be coupled to the gate of the power amplifier 1224. In some instances, the analog voltage input 1226 and the analog voltage input 1204 may correspond to the same signal lines, in other instances, 1204 and 1226 may be driven from a different source. In some instances, the analog voltage input 1226 and the analog voltage input 1204 can be provided by the controller 302 or the integrated circuit 304 of FIGS. 3A and 3B. In some instances, analog voltage input 1204 and 1226 may be provided by a manually-adjustable (e.g., with a screwdriver) variable resistor (e.g., potentiometer, rheostat, etc.). In some instances, analog voltage inputs 1204 and 1226 may be provided by a digitally-adjustable (e.g., programmable via SPI or I2C) variable resistor. In some instances, the digitally-adjustable variable resistor may be programmed by the controller 302 or the integrated circuit 304 of FIGS. 3A and 3B.

Further, a power amplifier input 1232 can be received, and an impedance match can be provided by an element 1234. In some instances, the power amplifier input 1232 can correspond to the driver amplifier output 1220. A DC block 1233 can couple the power amplifier input 1232 to the power amplifier input impedance match 1234, as illustrated. In some instances, the power amplifier 1224 can be controlled, at least in part, by the analog voltage input 1226, the power amplifier input 1232, and/or the enable 1227.

A drain voltage 1236 can be coupled to an RF choke 1238, which in turn can be coupled to the drain of the power amplifier 1224. The drain of the power amplifier 1224 can be further coupled to a power amplifier (PA) output impedance match 1240, the output of which can be provided as the power amplifier output 1242. In some instances, the power amplifier (PA) output impedance match 1240 may implement a two-stage impedance match, including LC-tank circuit (e.g., PA 1224 drain connected to a series inductor connected to shunt capacitor(s)), which matches to an intermediate impedance match (e.g., $Z0{\approx}2\Omega{\rightarrow}Z0{\approx}10\Omega$) prior to matching to the desired line impedance (e.g., $Z0{\approx}10\Omega{\rightarrow}Z0{=}50\Omega$). In some instances, the PA output impedance match 1240 can be coupled to a DC block 1241, which in turn can be coupled to the power amplifier output 1242.

Figure 13:
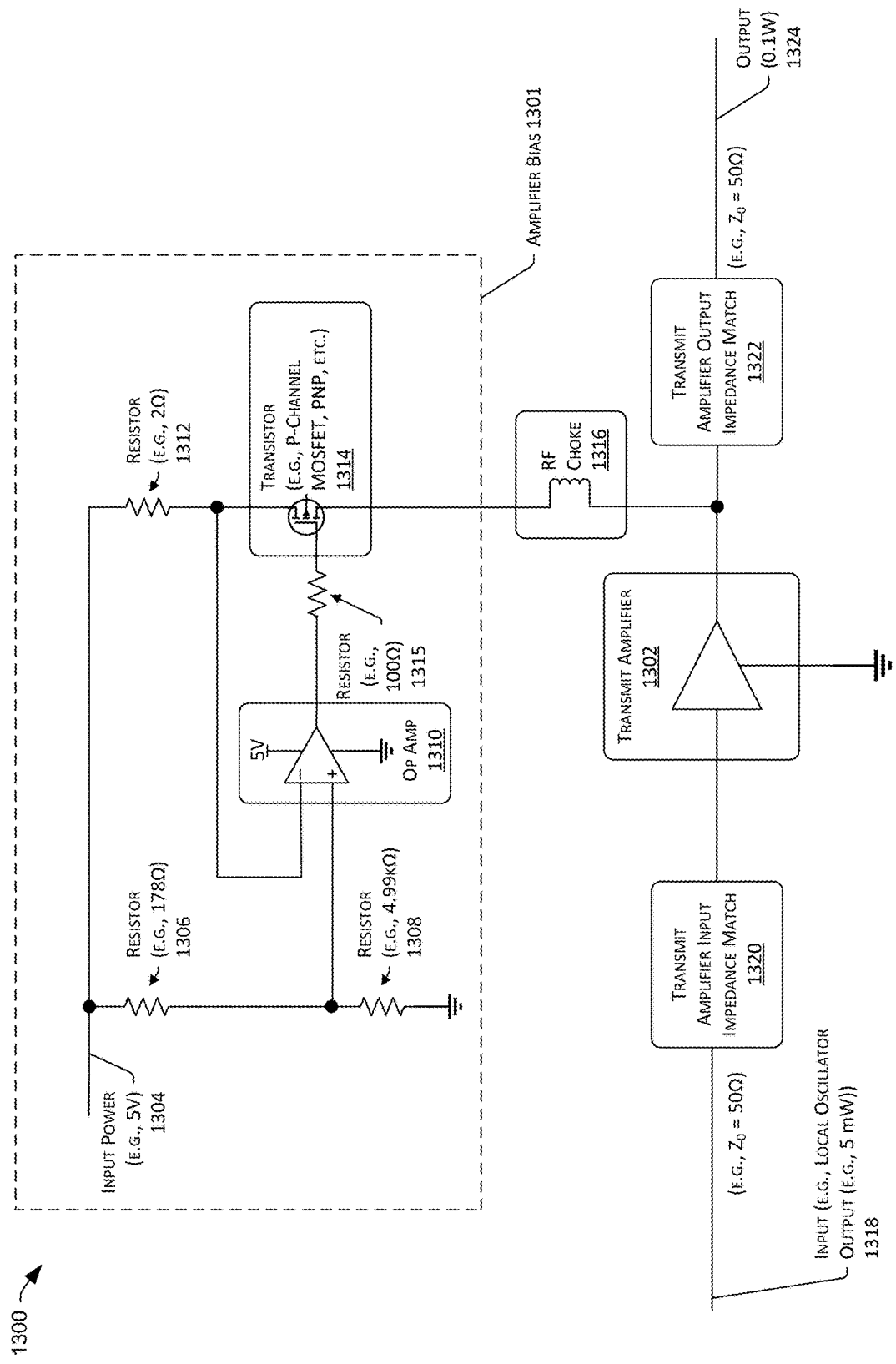
FIG. 13 illustrates example components of a constant current source for a transmit amplifier.

FIG. 13 illustrates example components 1300 of a constant current source for a transmit amplifier. In some instances, the transmit amplifier 1302 may correspond to the transmit amplifier 338 of FIGS. 3A and 3B. The configuration shown in FIG. 13 provides fast switching time with minimal power use and allows for operation at lower voltages (e.g. 5V), which simplifies system design (e.g., fewer power supplies) and further reduces power consumption of both transmit amplifier 1302 and the power required from the input power 1304.

In some instances, input power 1304 can be provided to the circuit. A voltage divider represented by resistors 1306 and 1308 can provide an input to the operational amplifier 1310 (e.g., to the non-inverting input). Further, a current sense resistor 1312 can be coupled to the input power 1304 and a second input of the operational amplifier 1310 (e.g., to the inverting input). The current sense resistor 1312 can be further coupled to a transistor 1314 (e.g., P-channel MOSFET, PNP bipolar, etc.) high-side input (e.g., source, emitter, etc.). An output of the operational amplifier 1310 can be coupled to the transistor 1314 input (e.g. gate or base) through a resistor 1315. Further, the output of the transistor 1314 (e.g., drain or collector) can be coupled to an RF choke 1316, which in turn can be coupled to the output of the transmit amplifier 1302. In some instances, the input power 1304, the resistors 1306, 1308, 1312, and 1315, the operational amplifier 1310, and the transistor 1314 can be represented as an amplifier bias 1301.

The components 1300 can further include an input 1318, which may correspond to an output from the local oscillator 320 (e.g., via the SPDT switch 328, or other such distribution components, such as a power splitter, coupler, tap, etc.) of FIGS. 3A and 3B. The input 1318 can be provided to a transmit amplifier input impedance match 1320, which in turn can be provided as input to the transmit amplifier 1302. An output of the transmit amplifier 1302 can be provided to a transmit amplifier output impedance match 1322, which in turn can be provided as an output 1324. In some instances, the output 1324 can correspond to the driver input 1210 of FIG. 12A.

Figure 14:
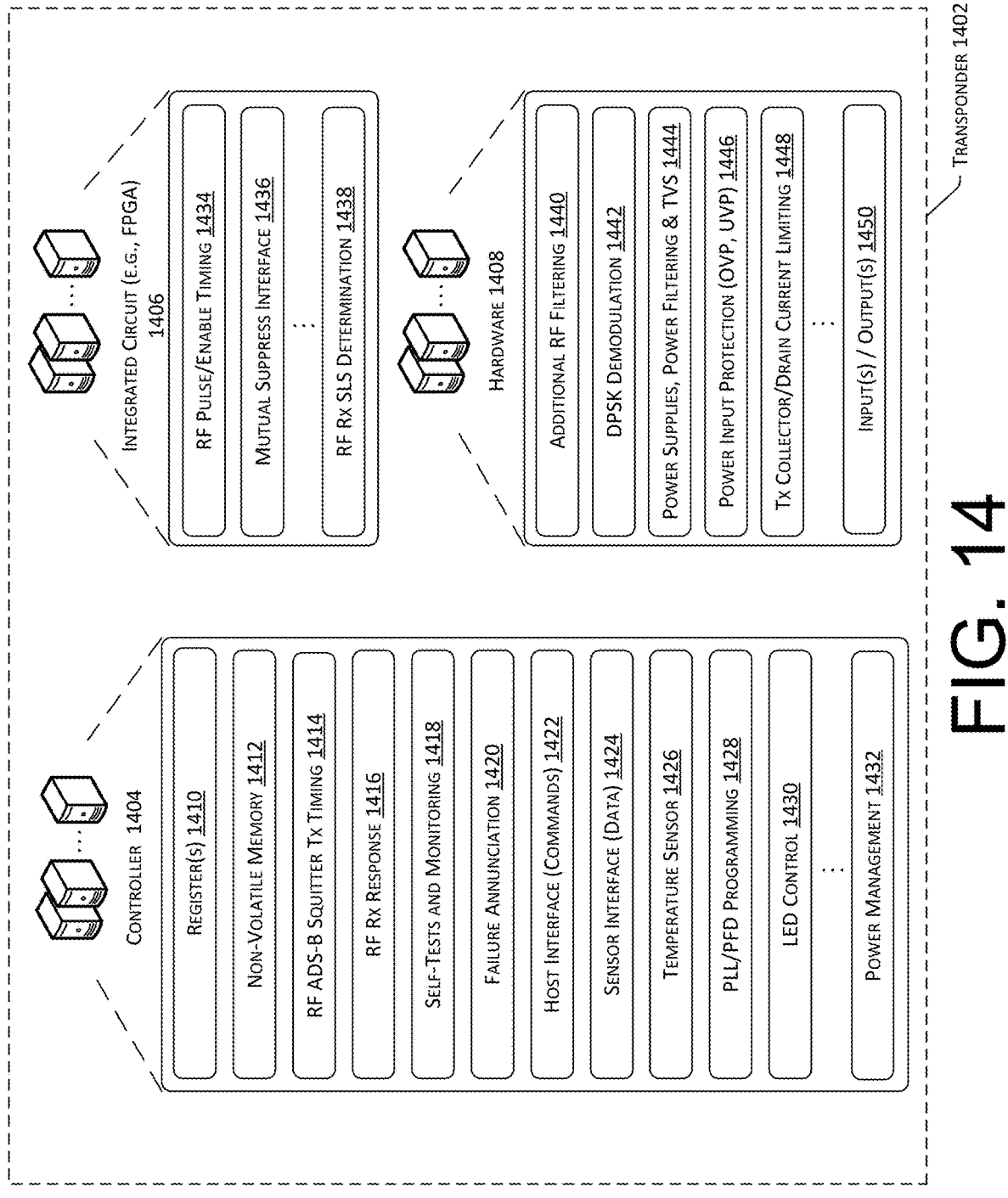
FIG. 14 illustrates a block diagram illustrating a division of tasks between various components in a transponder.

FIG. 14 illustrates a block diagram 1400 illustrating a division of tasks between various components in a transponder. For example, a transponder 1402 can correspond to the transponders 104, 202, 300, 364, 402, 800, and 900, as discussed herein.

In some instances, components of the transponder 1402 can be grouped generally into a controller 1404, an integrated circuit 1406, and hardware 1408.

In some embodiments, the controller 1404 can correspond to the controller 302 of FIGS. 3A and 3B. In some instances, the controller 1404 can include one or more registers 1410, which can be configured to store a squawk code, pressure altitude, surface position, airborne position, GNSS height-above-ellipsoid, airborne velocity, aircraft status, and the like. The controller 1404 can further include non-volatile memory 1412 to store ICAO address, aircraft identity and capability information, sensor data received from various sensors and components, for example, and to send such information as discussed herein. The controller 1404 can further include an RF ADS-B squitter transmitter timing component 1414, which can include functionality to transmit ADS-B information upon request or on any regular or irregular (e.g., pseudorandom) intervals. In some instances, the RF receiver response component 1416 can include functionality to determine information requested of the transponder and make the information available for transmission.

The controller 1404 can further include self-tests and monitoring 1418, which can include functionality to monitor hardware (e.g., supply voltages, temperature, PLL "lock", FPGA "done", no-RF RSSI values, etc.). In some instances, the self-tests and monitoring component 1418 performs monitoring required by the MOPS (e.g., ICAO address set, ADS-B squitter monitor, etc.). In some instances, failure of the self-tests and monitoring 1418 may cause an alert to the host (e.g., pilot, autopilot, flight computer, etc.) in the form of a failure annunciation 1420.

The controller 1404 can further include a host interface 1422, for parsing commands received from the host, and for responding appropriately. The controller 1404 can further include sensor interface 1424, in order to interface with various sensors, including fusion of disparate sensor data, as discussed herein. In some embodiments, the controller 1404 can further include a temperature sensor 1426 for monitoring transponder internal temperature and performing temperature compensation, as necessary. In some embodiments, an out-of-range temperature condition determined from temperature sensor 1426 (e.g., overtemperature, undertemperature, temperature rate change, etc.) may cause annunciation to the host via the failure annunciation 1420. In some instances, the controller 1404 can further include programming radio frequencies and modulation/demodulation parameters via PLL/PFD programming 1428 component. In some embodiments, the controller 1404 may include LED control 1430 to illuminate one or more externally-visible LEDs to provide the user with visual feedback on a transponder power state, transmit/receive events, and error indications. In some instances, the controller 1404 can further include power management component 1432. In some embodiments, power management 1432 may allow for power-down, at least in part, of the integrated circuit 1406 and/or the hardware 1408.

In some embodiments, the integrated circuit 1406 can correspond to the integrated circuit 304 of FIGS. 3A and 3B. In some instances, the RF pulse/enable timing component 1434 can include functionality to evaluate wirelessly received data for correct waveform timing and relative amplitude (e.g., pulse width, pulse position, pulse amplitude, pulse-to-pulse spacing, etc.), and to determine if the valid message received should pass along to the controller 1404. In some instances, the RF pulse/enable timing component 1434 can control the RF transmitter pulse modulation. In some embodiments, the RF pulse/enable timing component 1434 can additionally control amplifier enables, discussed herein. In some instances, RF pulse/enable timing component 1434 can control other modulation (e.g., direct-gate modulation, direct-collector modulation, SPDT switch on/off modulation, IQ modulation of phase during squitter, etc.). In some instances, the RF pulse/enable timing component 1434 can include functionality to modulate the transmitter to send the requested information, using any pulse timing. In some instances, the RF pulse/enable timing component 1434 can include functionality to control the various switches in the transponder 1402, as discussed herein. In some instances, the RF pulse/enable timing component 1434 can include functionality to enable and/or disable various components in the transponder 1402 to minimize power consumption. In some instances, the mutual suppress interface 1436 can receive and/or send indications corresponding to timing of when the transponder 1402 can transmit and/or receive, and or corresponding to timing of when other aircraft components (e.g., of the aircraft in which the transponder is installed) can transmit and/or receive. In some instances, the RF Rx SLS determination component 1438 can include functionality to determine if the transponder 1402 is in the main lobe of the radar and whether or not the transponder 1402 should reply to a received interrogation.

In some embodiments, the hardware 1408 can correspond to the remaining aspects of FIGS. 3A and 3B not included in the controller 302 or integrated circuit 304, as discussed herein. In some instances, the additional RF filtering components 1440 can include functionality to filter signals in an antenna path of the transponder 1402 and/or to filter signals in the receive path of the transponder 1402. In some instances, the differential phase-shift keying (DPSK) demodulation component 1442 can include functionality to power on and detect phase shifts in the interrogation signal when a valid interrogation waveform has been detected. In some instances, the DPSK demodulation component 1442 can correspond to the Costas loop 366 of FIG. 3B. In some instances, the power supplies component 1444 can include functionality to receive power from an internal or external source of power and to convert the electrical power into a variety of voltage sources and/or current sources. In some embodiments, power supplies component 1444 may include power filtering and/or transient voltage protection (TVS). In some embodiments, the power supplies component 1444 may include protection from electrostatic discharge (ESD).

In some embodiments, the power supplies component 1444 may include voltage protection from lightning strikes. The power supplies component 1444 can include any number of buck-boost power supplies, boost power supplies, buck power supplies, and the like. In some embodiments, a power input protection 1446 may include protection against extended overvoltage events (e.g., overvoltage protection (OVP)), for example, power surges that occur from inductive load switching. In some instances, the power input protection 1446 may include protection against undervoltage events, such as reverse polarity or surges (e.g., undervoltage protection (UVP)). In some embodiments, an amplifier limiting component 1448 can automatically limit collector and/or drain current into the amplifiers to levels optimized for normal use. In some embodiments, the amplifier limiting component 1448 can limit amplifier levels under abnormal conditions (e.g., during load mismatch, such as when no antenna connected), to prevent transponder damage. In some instances, the input(s)/output(s) component 1450 can include functionality to interface with other components and/or devices of an aircraft.

Figure 15A:
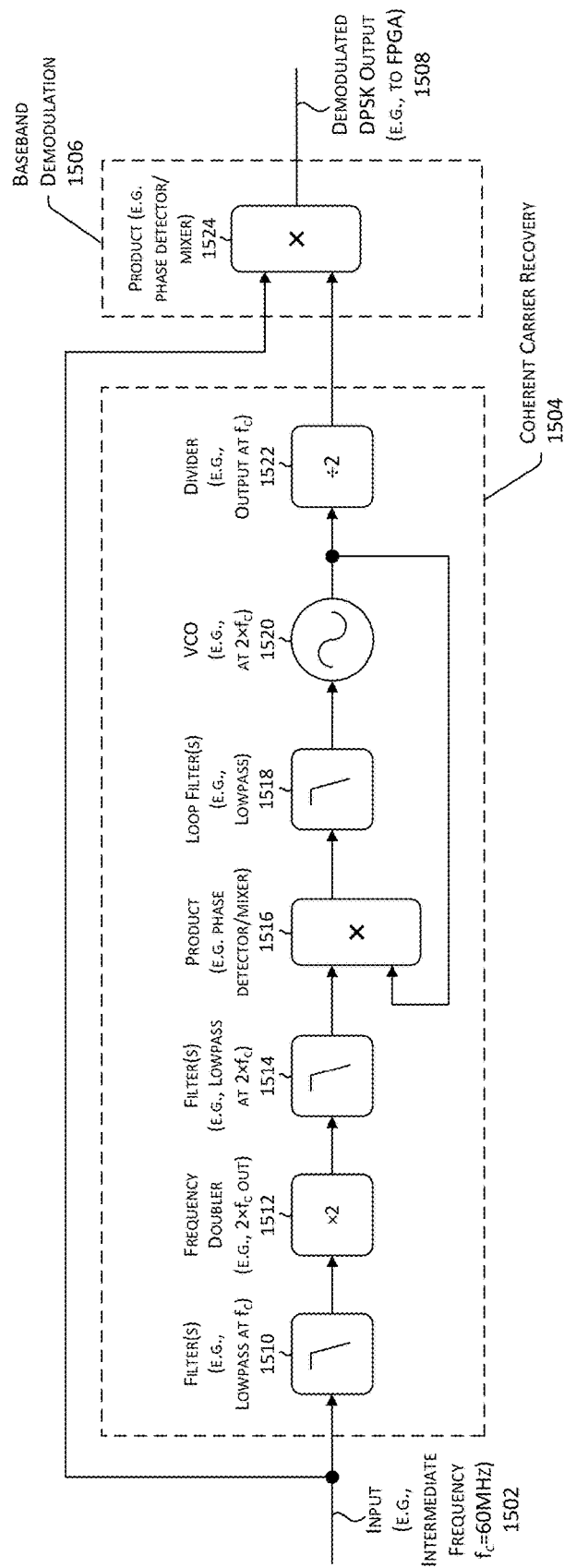
FIG. 15A shows a block diagram of an example Costas loop with coherent carrier recovery and baseband demodulation.

FIG. 15A illustrates a block diagram of components 1500 of a DPSK demodulator (e.g., a Costas loop) implemented entirely in hardware, the output of which is a demodulated bitstream that corresponds to the desired data. In some instances, additional demodulation can include (e.g., to be performed by the integrated circuit 304) resolving any phase ambiguity architecture by comparing the demodulated data during the sync phase to invert ONEs to ZEROS, or vice versa, if necessary (e.g., bitwise inversion). In some instances, the block diagram 1500 can correspond to the Costas loop 366 as illustrated in FIG. 3B.

An input 1502 carries a DPSK signal, which can include 0° and 180° phase shifts at the input frequency (e.g., 60 MHz). The input 1502 connects to a first lowpass filter 1510, which in turn can be coupled to a frequency doubler 1512 (e.g., such that an output of the frequency doubler is 120 MHz), which in turn is coupled to a second lowpass filter 1514 (e.g., which can be configured to allow the doubled frequency through). Because the doubled frequency (e.g., 120 MHz) is in phase with both 0° and 180° phase shifts of the input frequency (e.g., 60 MHz), the doubled frequency (e.g., output by the filter(s) 1514) can be used to provide a reference for a product 1516 (e.g., implemented as mixer, phase detector, phase-locked loop (PLL), etc.) which can be coupled to loop filter 1518, which can maintains the voltage controlled oscillation (VCO) at the same frequency (e.g., 120 MHz) and phase as the output of the frequency doubler 1512 and second filter 1514. The output of the divider 1522 can be compared with the input 1502 at product 1524 to determine if the carrier recovery 1504 is in phase with the input 1502 (e.g., baseband demodulation 1506 outputs (e.g., an output 1508) a "0") or out-of-phase with the input (e.g. baseband demodulation outputs a "1" as the output 1508).

Figure 15B:
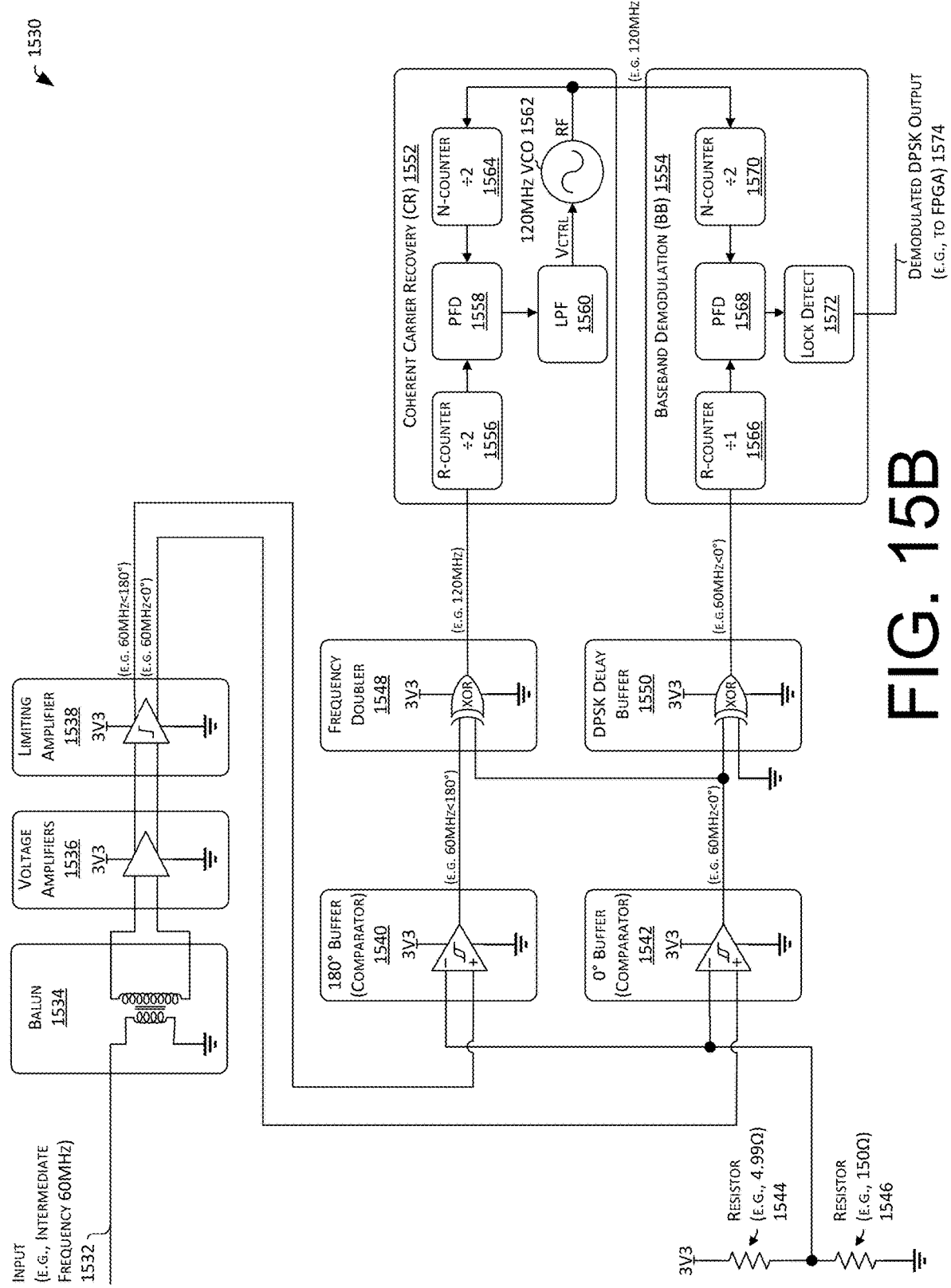
FIG. 15B illustrates example components for a Costas loop implemented in hardware.

FIG. 15B illustrates example components 1530 for a Costas loop implemented in hardware. In some instances, the example components 1530 for the Costas loop can correspond to the Costas loop 366 as illustrated in FIG. 3B.

An input 1532 carries the unbalanced (e.g., single-ended), modulated DPSK signal (e.g., on intermediate frequency 60 MHz) to a balun 1534, which converts from a signal from an unbalanced signal to a balanced (e.g., differential) signal. Voltage amplifiers 1536 can increase the signal strength and a limiting amplifier 1538 can output a balanced signal with sufficient peak-to-peak voltage to drive low-voltage transistor-transistor logic (LVTTL) logic. In some instances, the limiting amplifier 1538 can provide balanced outputs that are treated as two unbalanced outputs at the intermediate frequency (IF) (e.g., 60 MHz): a first signal at 0°, and a second signal at 180°. In some embodiments, a high-speed comparator 1540 can be used to increase the signal strength (e.g., a peak-to-peak voltage swing) of the 180° branch, and a high-speed comparator 1542 can be used to increase the signal strength (e.g., a peak-to-peak voltage swing) of the 0° branch. Additionally, the high-speed comparators 1540 and 1542 can be adjusted via a resistor 1544 and a resistor 1546 to modify respective trip points, output duty cycle, and relative phases. Further, the hysteresis of high speed comparators 1540 and 1542 can be adjusted (not shown) to provide additional control of trip point, output duty cycle, and relative phase.

A frequency doubler 1548 can be configured to operate as an XOR gate, as both outputs of the comparator 1540 and the comparator 1542 are 180° out-of-phase with respect to each other, each with less than 50% (<50%) duty cycle. Given these inputs, the output of the frequency doubler 1548 can be double the IF frequency (e.g., 120 MHz). Further, an output of the frequency doubler 1548 can be in phase with both 0° and 180° branches of the IF frequency (e.g., 60 MHz). An output of the frequency doubler 1548 can be provided to a coherent carrier recovery 1552.

The coherent carrier recovery 1552 can receive input and provide the input to a R-counter (divided by 2) component 1556, which in turn can provide an input to a phase frequency detector (PFD) component 1558. The coherent carrier recovery 1552 can utilize a phase locked loop (PLL)—implemented in the phase frequency detector (PFD) 1558, a low pass filter (LPF) 1560 (e.g., a loop filter), and an N-Counter 1564—in order to maintain a voltage controlled oscillator (VCO) 1562 in phase and same frequency (e.g., 120 MHz) as the output of the frequency doubler 1548 (e.g., to keep the VCO phase- and frequency-locked to double the IF frequency). In some instances, the VCO 1562 helps to maintain continuity during phase transitions of the incoming waveform.

Further, in some instances, a baseband demodulation 1554 can compares the output of the coherent carrier recovery 1552, divided by two in N-counter 1570, with the output of the DPSK delay buffer 1550 received by an R-counter (divided by 1) component 1556 and compared in the PFD 1568 component (e.g. using PFD compare frequency of 60 MHz). An output of the PFD component 1568 can be provided to a lock detect component 1572, which in turn can output a determination corresponding to a demodulated DPSK output 1574. For example, for one embodiment, if the PFD lock detect 1572 is configured for digital lock output, if the two signals are in phase, the demodulated DPSK output 1574 will be a ONE (e.g., "1", or a "high" voltage signal). Conversely, if the PFD 1568 determines the outputs of the R-counter 1566 and N-counter 1570 are not in phase, the demodulated DPSK output 1574 will be a ZERO (e.g., "0", or a "low" voltage signal). For some embodiments, the demodulated DPSK output 1574 polarity may be inverted with respect to the actual data (e.g., the "real" data), and may need a bitwise flip operation. As previously mentioned, the output may have phase ambiguity. However, this phase ambiguity can be resolved, as the beginning of the DPSK waveform can include a sync phase and sync phase reversal, to easily compare against (e.g., in controller 302 or integrated circuit 304).

In some instances, some or all of the components 1500 and/or 1530 can be selectively enabled and disabled to conserve power during operation of the transponder. For example, the components and subcomponents can be controlled by the integrated circuit 304, for example, based at least in part on a receipt of an appropriate pulse pattern from the log detect 360.

In some instances, the phase frequency detectors 1558 and 1568 can receive programming and/or instructions from the controller 302, for example. In some instances, the programming may come from the integrated circuit 304. In other embodiments, no programming may be necessary.

Figure 16A:
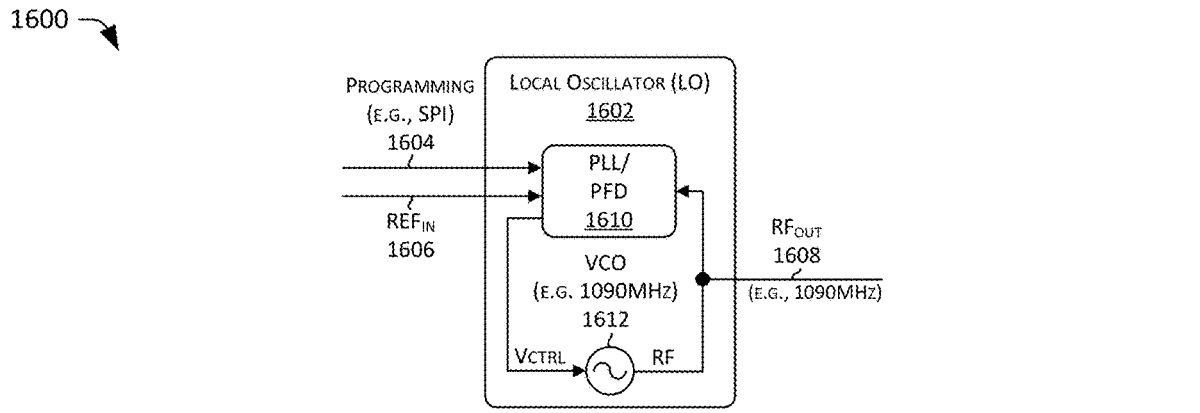
FIG. 16A illustrates an example local oscillator used to generate a frequency for an example transponder.

FIG. 16A illustrates an example local oscillator 1602 used to generate a first frequency. For example, local oscillator 1602 may correspond to local oscillator 320. In some instances, local oscillator 1602 may receive programming 1604 (e.g., via a serial peripheral interface (SPI)) via the controller 302, for example. In some instances, the reference frequency input (e.g., $REF_{IN}$) 1606 provides the comparison basis for the PFD (e.g., after divided down to a compare frequency of 1 MHz to 5 MHz by the R-counter, omitted from 1602 for brevity). The programming inputs 1604 interface digitally with the PLL/PFD 1610. The clock reference input 1606 provides the loop compare frequency to the PLL/PFD 1610 (e.g., after the R-counter). The PLL/PFD 1610 can generate a voltage control (e.g., $V_{CTRL}$), proportional to the detected phase error, which in turn can be used to maintain voltage controlled oscillator (VCO) 1612 output locked to an integer multiple of the input reference clock 1606. In some instances, an output of the VCO 1612 can be provided to the PLL/PFD 1610, and in some instances, the output of the VCO 1612 can be provided as an output ($RF_{OUT}$) 1608.

Figure 16B:
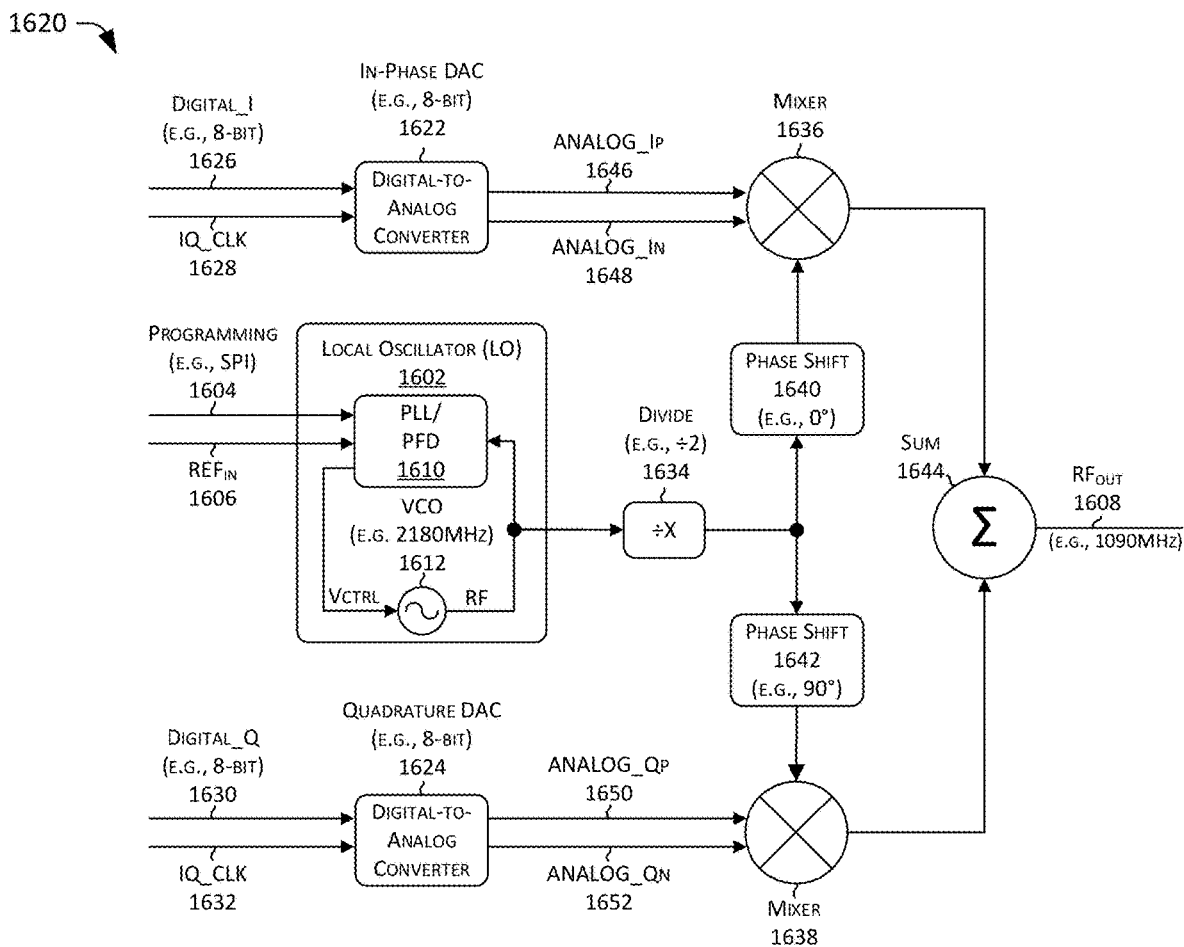
FIG. 16B illustrates another implementation of an example local oscillator used to generate a for an example transponder.

FIG. 16B illustrates an example local oscillator 1620 used to generate the first frequency, adding an I/Q modulator (e.g., with "I" representing an "in-phase" component and "Q" representing a quadrature component. The I/Q modulation can be provided at least in part, by some of all of an in-phase DAC 1622, a quadrature DAC 1624, a divide component 1634, an in-phase mixer 1636, a quadrature mixer 1638, an in-phase shift 1640, a quadrature phase shift 1642, and a sum 1644. In some instances, the local oscillator 1620 can facilitate modulation at multiple phase angles (e.g., 8PSK with angles 0°, 45°, 90°, 135°, 180°, 225°, 270°, and 315°). In some embodiments, local oscillator 1620 may correspond to local oscillator 320.

As illustrated, the in-phase DAC 1622 can comprise an 8-bit DAC receiving a digital input (e.g., digital_I) 1626 and an IQ_CLK 1628. Further, the quadrature DAC 1624 can comprise an 8-bit DAC receiving a digital input (e.g., digital_Q) 1630 and an IQ_CLK 16332. The DACs 1622 and 1624 can provide outputs to the mixers 1636 and 1638, respectively (as outputs 1646, 1648, 1650, and 1652, respectively). Further, the LO 1602 can provide an output of the VCO 1612 to a divide 1634 component, which in turn can be provided to phase shift components 1640 and 1642, which in turn can be coupled to the mixers 1636 and 1638, respectively. Outputs of the mixers 1636 and 1638 can be provided to the sum 1644 component, which in turn can output the output 1608, including modulation on multiple phase angles.

Conclusion

Although the present disclosure can use language that is specific to structural features and/or methodological acts, the invention is not limited to the specific features or acts described herein. Rather, the specific features and acts are disclosed as illustrative forms of implementing the invention.

What is claimed is:

1. An aviation transponder comprising:
   a housing;
   at least one antenna port;
   at least one input port to receive sensor data;
   at least one controller configured to control at least a portion of operations of the aviation transponder;
   a local oscillator configured to generate a radio signal at a first frequency;
   a distribution component coupled to the local oscillator and configured to selectively couple the local oscillator to a transmit path or a mixer associated with a receive path; and
   a switch coupled to an antenna path and configured to selectively couple the antenna path to the transmit path or to the receive path;
   wherein the antenna path includes at least one first filter;
   wherein the transmit path includes at least one transmit amplifier;
   wherein the receive path including at least:
      at least one receive amplifier;
      at least one second filter; and
      the mixer; and
   wherein the at least one controller is configured to, at a first time:
      enable the at least one transmit amplifier;
      cause the switch to couple the transmit path to the antenna path; and
      cause the at least one antenna port to output an identification signal.

2. The aviation transponder of claim 1, wherein the aviation transponder supports at least one of:
   a Mode A interrogation mode;
   a Mode C interrogation mode;
   a Mode S interrogation mode; or
   an automatic dependent surveillance broadcast (ADS-B).

3. The aviation transponder of claim 1, wherein the switch is a first switch, and wherein the distribution component is a second switch.

4. The aviation transponder of claim 1, wherein the switch is a first switch, wherein the distribution component is a second switch, and wherein the controller is further configured to, at a second time:
   disable the at least one transmit amplifier;
   cause the second switch to couple the local oscillator to the mixer associated with the receive path;
   cause the first switch to couple the receive path to the antenna path; and
   receive an interrogation signal via the at least one antenna port.

5. The aviation transponder of claim 4, wherein the receive path further includes a Costas loop implemented in hardware, and wherein the Costas loop is configured to determine a phase shift associated with the interrogation signal.

6. The aviation transponder of claim 4, wherein the mixer is configured to:
   receive the radio signal from the local oscillator at the first frequency;
   receive the interrogation signal at a second frequency; and
   determine an intermediate frequency based at least in part on a difference between the radio signal and the interrogation signal.

7. The aviation transponder of claim 1, wherein the local oscillator is implemented as a I/Q modulator configured to support 8 phase shift keying (8PSK).

8. The aviation transponder of claim 1, wherein:
   the at least one controller includes a controller and an integrated circuit;

the controller is configured to receive a reference signal from a reference oscillator and to provide the reference signal to the integrated circuit; and the integrated circuit is configured to receive the reference signal from the controller and to provide the reference signal to the local oscillator.

9. The aviation transponder of claim 1, further comprising an input configured to receive a command to cause the aviation transponder to enter a low power mode.

10. The aviation transponder of claim 1, wherein the at least one transmit amplifier includes at least:
a first transmit amplifier;
a driver amplifier; and
a power amplifier.

11. The aviation transponder of claim 1, wherein the receive path further includes at least one limiter component including:
at least one quarter-wave element, wherein an electrical length of the quarter-wave element is based at least in part on the first frequency; and
at least one diode; and
wherein the at least one quarter-wave element and the at least one diode are configured to direct a signal received via the at least one antenna port to a ground plane at a time in which a power of the signal is above a radio frequency power threshold.

12. The aviation transponder of claim 1, wherein the sensor data includes at least one of:
first sensor data associated with an altitude of an aircraft;
second sensor data associated with a vertical rate-of-change of the aircraft;
third sensor data associated with an airspeed of the aircraft;
heading data associated with a heading of the aircraft; or
location data associated with the aircraft, the location data based at least in part on a global navigation satellite system (GNSS) signal.

13. A transponder comprising:
at least one antenna port;
at least one controller;
a local oscillator configured to generate a radio signal at a first frequency;
a first switch coupled to the local oscillator and configured to selectively couple the local oscillator to a transmit path or a receive path; and
a second switch coupled to an antenna path and configured to selectively couple the antenna path to the transmit path or to the receive path;
wherein the at least one controller is configured to, at a first time:
cause the first switch to couple the local oscillator to at least a portion of the receive path;
cause the second switch to couple the receive path to the antenna path; and
receive an interrogation signal via the at least one antenna port; and
wherein the at least one controller is configured to, at a second time after the first time:
enable at least one transmit amplifier associated with the transmit path;
cause the first switch to couple the local oscillator to the transmit path;
cause the second switch to couple the transmit path to the antenna path; and
cause the at least one antenna port to output an identification signal at least partially in response to receiving the interrogation signal.

14. The transponder of claim 13, further comprising:
a reference oscillator configured to provide a clock signal to the at least one controller and the local oscillator.

15. The transponder of claim 13, wherein the identification signal is a first identification signal, and wherein the at least one controller is configured to, at a third time:
cause the at least one antenna port to output a second identification signal independent of receiving the interrogation signal.

16. The transponder of claim 13, wherein the transmit path includes at least one transmit amplifier, at least one driver amplifier, and at least one power amplifier.

17. The transponder of claim 13, wherein the receive path further includes a Costas loop implemented in hardware, and wherein the Costas loop is configured to determine a phase shift associated with the interrogation signal.

18. A method comprising:
causing, by at least one controller of a transponder, and at a first time, a first switch to couple a local oscillator to at least a portion of a receive path of the transponder;
causing, by the at least one controller, a second switch to couple the receive path to an antenna path of the transponder;
receiving an interrogation signal via at least one antenna port;
enabling, by the at least one controller, at least one transmit amplifier associated with a transmit path;
causing, by the at least one controller, and at a second time that is different than the first time, the first switch to couple the local oscillator to the transmit path;
causing, by the at least one controller, the second switch to couple the transmit path to the antenna path; and
causing, by the at least one controller, at least one antenna port to output an identification signal at least partially in response to receiving the interrogation signal.

19. The method of claim 18, further comprising:
receiving, by the at least one controller, sensor data from one or more sensors; and
causing, by the at least one controller, a representation of at least a portion of the sensor data to be output along with the identification signal.

20. The method of claim 18, further comprising transmitting the identification signal in accordance with at least one of:
a Mode A interrogation mode;
a Mode C interrogation mode;
a Mode S interrogation mode; or
an automatic dependent surveillance broadcast (ADS-B).

* * * * *